US007744460B2

(12) United States Patent
Walker et al.

(10) Patent No.: US 7,744,460 B2
(45) Date of Patent: Jun. 29, 2010

(54) APPARATUS HAVING MOVABLE DISPLAY AND METHODS OF OPERATING SAME

(75) Inventors: Jay S. Walker, Ridgefield, CT (US); Geoffrey M. Gelman, Stamford, CT (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/351,093

(22) Filed: Feb. 9, 2006

(65) Prior Publication Data

US 2006/0199638 A1 Sep. 7, 2006

Related U.S. Application Data

(62) Division of application No. 10/444,776, filed on May 23, 2003.

(60) Provisional application No. 60/383,059, filed on May 23, 2002.

(51) Int. Cl.

| | |
|---|---|
| ***A63F 9/24*** | (2006.01) |
| ***A63F 13/02*** | (2006.01) |
| ***A63F 13/10*** | (2006.01) |
| ***A63F 13/08*** | (2006.01) |
| *A63F 5/04* | (2006.01) |
| *G07F 17/34* | (2006.01) |

(52) U.S. Cl. ............................. 463/21; 463/16; 463/20; 463/31

(58) Field of Classification Search ................... 463/20, 463/16, 30–33, 21; 273/138.1, 139, 142 H, 273/142 HA, 141, 142, 143, 141 R, 141 A, 273/142 R, 143 R, 143 A, 142 B, 138.2
See application file for complete search history.

(56) References Cited

U.S. PATENT DOCUMENTS

| | | | | |
|---|---|---|---|---|
| 2,152,599 A * | 3/1939 | Mills | ...................... | 273/143 R |
| 3,759,525 A | 9/1973 | Davis | | |
| 4,095,795 A | 6/1978 | Saxton et al. | ........... | 273/143 R |
| 4,240,635 A | 12/1980 | Brown | .................... | 273/138 A |
| 4,448,419 A | 5/1984 | Telnaes | | |

(Continued)

FOREIGN PATENT DOCUMENTS

GB 2 116 345 A 9/1983

(Continued)

*Primary Examiner*—Peter DungBa Vo
*Assistant Examiner*—Matthew D. Hoel
(74) *Attorney, Agent, or Firm*—Armstrong Teasdale LLP

(57) ABSTRACT

In accordance with one or more embodiments, a slot machine comprises at least one display device operable to display at least one indicium. The indicium defines an outcome for a game. The display device is further operable to update the indicia displayed on the one or more display devices based on a signal of a processor. The slot machine further comprises a means for moving the at least one display device. For example, the one or more display devices may be moved about an axis in a circular or curvilinear path, relative to a viewing perspective. In other embodiments, a slot machine comprises at least one display device operable to display at lease on indicium defining an outcome for a game, wherein a left edge of the display device defines at least a portion of perimeter of a left base of a cylindrical shape and a right edge of the display device defines at least a portion of a perimeter of a right base of the cylindrical shape.

20 Claims, 12 Drawing Sheets

U.S. PATENT DOCUMENTS 4,573,681 A 3/1986 Okada .................... 273/143 R
4,838,554 A 6/1989 Sutter et al.
5,152,529 A * 10/1992 Okada ......................... 463/20
5,162,696 A 11/1992 Goodrich
5,423,540 A 6/1995 Taxon .................... 273/143 R
5,683,296 A 11/1997 Rasmussen
5,697,843 A 12/1997 Manship et al. ............... 463/20
5,725,428 A 3/1998 Achmuller ................... 463/20
5,752,991 A 5/1998 Plavac
6,003,867 A 12/1999 Rodesch et al.
6,027,115 A * 2/2000 Griswold et al. ........ 273/143 R
6,071,190 A 6/2000 Weiss et al.
6,086,066 A 7/2000 Takeuchi et al. ........ 273/143 R
6,186,894 B1 2/2001 Mayeroff ..................... 463/20
6,270,412 B1 8/2001 Crawford et al. .............. 463/20
6,315,663 B1 * 11/2001 Sakamoto .................... 463/20
6,517,433 B2 2/2003 Loose et al. .................. 463/20
6,517,437 B1 * 2/2003 Wells et al. ................... 463/30
6,523,824 B1 2/2003 Colapinto et al.
6,533,664 B1 3/2003 Crumby ....................... 463/42
6,638,165 B2 * 10/2003 Uchiyama et al. ............. 463/20
6,817,946 B2 * 11/2004 Motegi et al. ................. 463/31
6,866,582 B2 3/2005 Watanabe et al.
6,976,915 B2 12/2005 Baker et al.
7,008,324 B1 3/2006 Johnson et al.
7,021,795 B2 4/2006 Coates et al.
7,060,591 B2 6/2006 Yamazaki
7,160,187 B2 * 1/2007 Loose et al. .................. 463/20
7,166,029 B2 * 1/2007 Enzminger ................... 463/20
2002/0142832 A1 10/2002 Loose et al. .................. 463/30
2002/0175466 A1 11/2002 Loose et al. ............ 273/143 R
2003/0027624 A1 2/2003 Gilmore et al. ............... 463/20
2003/0060269 A1 * 3/2003 Paulsen et al. ................ 463/20
2003/0060271 A1 3/2003 Gilmore et al. ............... 463/20
2003/0073484 A1 4/2003 Jo
2003/0087690 A1 * 5/2003 Loose et al. .................. 463/20
2003/0104855 A1 6/2003 McClintic
2003/0107530 A1 * 6/2003 Motegi et al. .................. 345/6
2003/0119577 A1 * 6/2003 Motegi et al. ................. 463/20
2003/0130028 A1 7/2003 Aida et al.
2003/0130034 A1 * 7/2003 Suganuma et al. ............ 463/30
2003/0134488 A1 7/2003 Yamazaki
2003/0190944 A1 10/2003 Manfredi et al.
2004/0125601 A1 7/2004 Coates et al.
2004/0135160 A1 7/2004 Cok
2004/0198485 A1 * 10/2004 Loose et al. .................. 463/20
2004/0229678 A1 * 11/2004 Onuki et al. .................. 463/20
2004/0266518 A1 * 12/2004 Gauselmann ................ 463/20
2005/0140088 A1 6/2005 Randall
2005/0170736 A1 8/2005 Cok
2005/0192090 A1 9/2005 Muir et al.

FOREIGN PATENT DOCUMENTS

GB 2 165 387 A * 4/1986
GB 2 205 661 A 12/1988
GB 2 233 806 A * 1/1991
JP 05161737 A 6/1993

* cited by examiner

900

| | INDICIUM IDENTIFIER 910 | INDICIUM DESCRIPTION 920 | GAME 930 | INDICIUM GRAPHIC 940 |
|---|---|---|---|---|
| R 950 | S0001 | CHERRY | FRUIT | <GRAPHIC DATA> |
| R 955 | S0002 | PYRAMID | ARCHEOLOGY | <GRAPHIC DATA> |
| R 960 | S0003 | BLANK | JUNGLE | <GRAPHIC DATA> |
| R 965 | S0004 | ACE OF SPADES | ALL POKER | <GRAPHIC DATA> |

FIG. 9

1000

| | SURFACE LOCATION IDENTIFIER 1010 | FIRST INDICIUM IDENTIFIER 1020 | SECOND INDICIUM IDENTIFIER 1030 | THIRD INDICIUM IDENTIFIER 1040 | FOURTH INDICIUM IDENTIFIER 1050 | CURRENT INDICIUM 1060 |
|---|---|---|---|---|---|---|
| R 1070 | DO1 | S0001 | S0002 | S0003 | S0004 | S0002 |
| R 1075 | DO2 | S0001 | S0004 | -- | -- | S0004 |
| R 1080 | DO3 | S0236 | S0239 | S0240 | S0250 | S0250 |

FIG. 10

APPARATUS HAVING MOVABLE DISPLAY AND METHODS OF OPERATING SAME

This application is a Divisional Application of U.S. application Ser. No. 10/444,776, filed May 23, 2003 and entitled APPARATUS HAVING MOVALBE DISPLAY AND METHODS OF OPERATING SAME, which claims the benefit of priority of U.S. Provisional Patent Application Ser. No. 60/383,059, filed May 23, 2002, entitled "VIDEO WRAPPED REELS." The entirety of each of these applications is incorporated by reference herein for all purposes.

BACKGROUND

Reeled slot machines are a very significant source of revenue for casinos. Reeled slot machines are slot machines that typically depict symbols along a plurality of reels that spin in response to a player initiation of a game. If, when the reels stop spinning, a predetermined combination of symbols (e.g., one respective symbol on each reel) is displayed along a payline of the slot machine, the player is provided with a monetary prize (typically referred to as a payout).

Up until fairly recently, reeled slot machine were exclusively of the mechanical reel type. Mechanical reel slot machines typically include a plurality of mechanical reels behind a transparent glass partition. A reel strip is a located along the outer periphery of each reel. The reel strips each depict a plurality of symbols along their length. The transparent glass partition has depicted thereon at least one payline. A stepper motor controls the motion of each reel and causes the reel to stop such that a desired one of the symbols depicted on the reel strip is displayed along the payline. A player initiates the movement of the reels by actuating a button or pulling a designated handle of the slot machine.

In the last two decades, however, significant changes have been made in the components of reeled slot machines. One change has been a movement to simulated reels in lieu of mechanical reels. Slot machines that include a video screen that depicts a graphical representation of a plurality of reels (rather than including mechanical reels) are often referred to as video slot machines. A video slot machine includes a display device on which is displayed data representing a plurality of reels. A simulation of the rotation of the reels is displayed on the display device in response to a player initiation of a game. A program executed by a process of the video slot machine determines which symbols to display on the simulated reels.

The video slot machines offer significant advantages to the casino over the mechanical reels. For example, they provide the casino with the flexibility of changing the symbols displayed on the simulated reels (e.g., thus easily and quickly changing or updating the game offered on the slot machine). Additionally, they allow the casino to display messages in addition to the symbols of the game (e.g., marketing messages). Further, the displays of video slot machines can depict animation sequences and exciting graphics that cannot be duplicated on the mechanical reels. The video reel slot machines also offer flexibility in that they do not require extra hardware for implementing bonus features because the same display used for the primary game can also be employed to display bonus game graphics.

However, there still remains a significant segment of slot machine players who prefer to play mechanical reel slot machines and who avoid playing video slot machines. Some such players prefer the mechanical reel slot machines due to feelings of nostalgia for the look and feel of traditional slot machines. Some older slot machine players are intimidated by the video-game-like appearance of the video slot machines. Some players perceive that their chances of obtaining a winning outcome on a mechanical reel slot machine are better because they have a better "feel" for the number of symbols depicted around the periphery of each reel and therefore perceive that they know the odds of each symbol appearing on a payline. In a video slot machine, these latter players feel that they have no way of getting a feel for how many symbols, or how many occurrences of each symbol, appear on each reel (since there is no reel) and are therefore distrustful of the odds of such machines.

Irrespective of the varied reasons, it remains true that a significant number of players prefer to play mechanical reel slot machines to video slot machines. It also remains true that video slot machines offer significant advantages to a casino over mechanical reel slot machines. Accordingly, a need exists for a slot machine that allows a casino to realize the benefits of video slot machines while attracting to the slot machine the players who prefer to play mechanical reel slot machines.

BRIEF DESCRIPTION OF THE DRAWINGS

FIG. 9 is a table illustrating an exemplary data structure of an indicia database, for use in one or more embodiments of the present invention.

FIG. 10 is a table illustrating an exemplary data structure of a surface location database, for use in one or more embodiments of the present invention.

DETAILED DESCRIPTION

Figure 1:
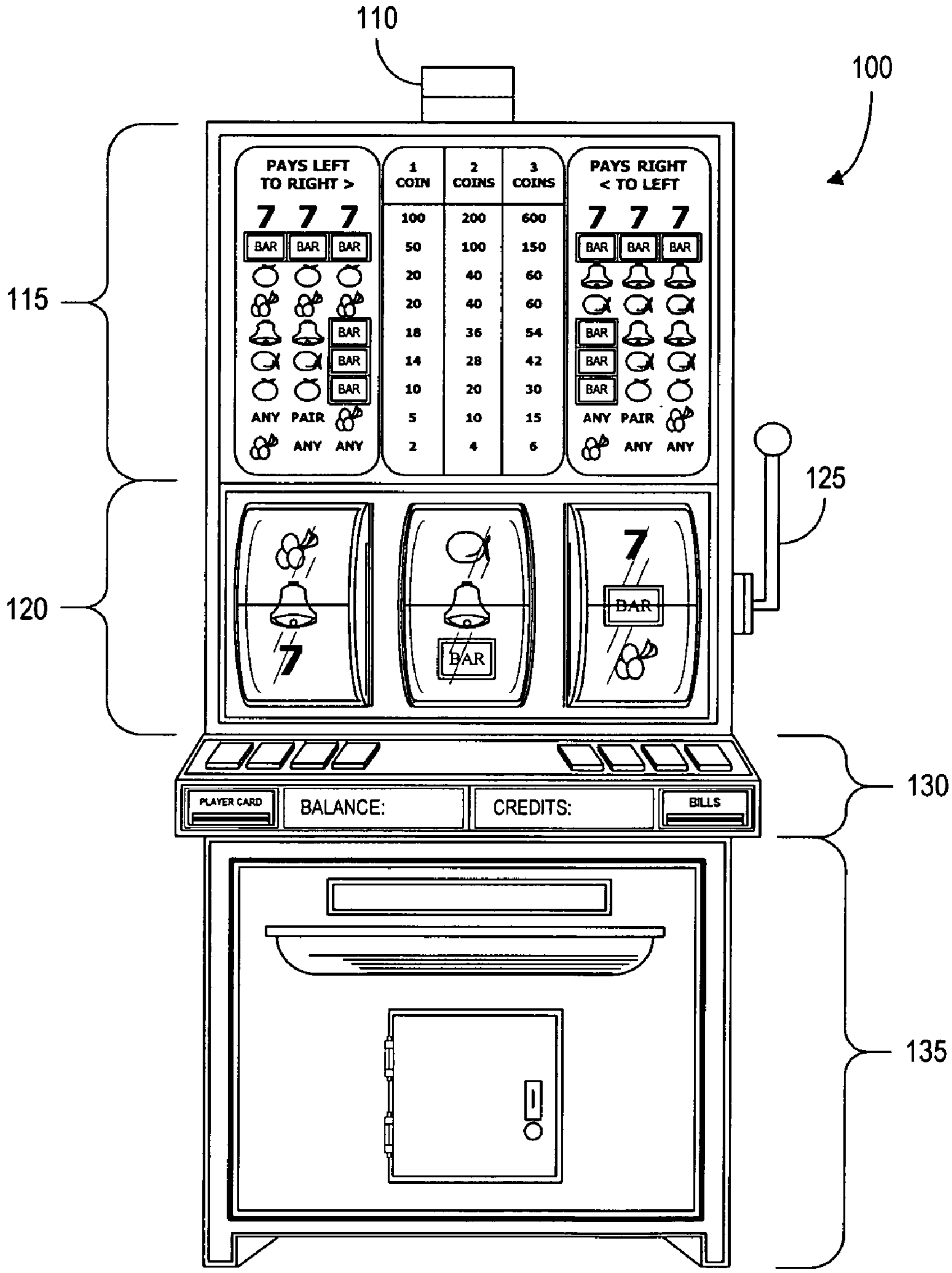
FIG. 1 is a front planar view of a slot machine, in accordance with one or more embodiments.

Applicants have recognized that it would be advantageous for operators of slot machines to operate slot machines that maintain the interest of players who prefer the look and feel of mechanical slot machines, without foregoing the flexibility and other benefits of video slot machines.

Applicants have also recognized that the players who prefer mechanical reel slot machines prefer reels that have a finite number of locations at which symbols may be displayed, thus providing the players with a perceived probability of each of the symbols appearing along the payline.

Applicants have also recognized that players who prefer video slot machines are typically attracted to the colorful and detailed graphics and sophisticated animations of such slot machines, and would thus be likely attracted to other types of slot machines that offer these features.

Applicants have also recognized that it would be advantageous for a casino to offer a single slot machine that appeals to both the player who prefer mechanical slot machines and players who prefer video slot machines, rather than having to spend resources on obtaining and maintaining two different types of slot machines.

In various embodiments of the present invention, a slot machine includes mechanically spinning reels that each comprise one or more display devices for electronically or optically displaying symbols. In this way, many of the advantages of both mechanical reel slot machines and video slot machines are combined into a single device. For example, the mechanically spinning reels and the finite number of surface locations for displaying indicia along the reels may alleviate player suspicions that outcomes are being generated in a biased fashion. Also, the display devices allow the slot machine to change the indicia displayed on the reels without the need for mechanical replacement of components. Therefore, a single mechanical reel comprising one or more display devices is operable to display a very large number of indicia relative to what a conventional mechanical reel with a reel strip is capable of displaying. Furthermore, multiple different games may be played on the same mechanical reel slot machine. The slot machine may switch games by changing one or more of the indicia displayed on the reels. The display devices may also allow for the inclusion of supplementary information for the player's viewing. For example, the display devices of a reel may display pay tables, instructions on how to use the slot machine, explanations of outcomes, and marketing offers.

In one embodiment, the reels of a slot machine are fitted with display devices on the outer surface of the rim of the reel. Display memories may be fitted, for example, on the inner surface of the rim. The display memories may store graphical information about multiple different indicia. In one embodiment, each of the display memories may be respectively in communication with a corresponding display device. For example, upon an instruction from a processor of the slot machine, the display memories may transmit data representing one or more indicia to the display devices, causing the display devices to change the symbols currently being displayed.

In one embodiment, power may be provided to the display devices and display memories via conducting strips of a reel. For example, one or more conducting strips may be electrically coupled to stationary power sources via, for example, wire brushes.

With these and other advantages and features of the invention that will become hereinafter apparent, the nature of the invention may be more clearly understood by reference to the following detailed description of the invention, the appended claims and to the several drawings included herein.

In the following description, reference is made to the accompanying figures that form a part hereof, and in which is shown, by way of illustration, specific embodiments in which the invention may be practiced. It should be noted that, with reference to the numbering of elements of the figures, the left most digit(s) of a reference numeral identifies the figure in which the reference numeral first appears. The embodiments described herein are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense.

It should also be noted that, as used herein, the terms "an embodiment", "embodiment", "embodiments", "the embodiment", "the embodiments" "one or more embodiments", "some embodiments", and "one embodiment" mean "one or more embodiments" unless expressly specified otherwise. Further, although particular features of the present invention may be described with reference to one or more particular embodiments or figures, it should be understood that such features are not limited to usage in the one or more particular embodiments or figures with reference to which they are described.

Embodiments of the present invention will first be introduced by means of the various devices that may be used in practicing the present invention. Exemplary data structures illustrating tables that may be used when practicing embodiments of the present invention will then be described, followed by a description of various processes that exemplify methods of the present invention and that may use the exemplary tables and be carried out by the various devices.

Devices

Referring now to FIG. 1, illustrated therein is a front planar view of an embodiment 100 of a slot machine in accordance with one or more embodiments of the present invention.

The slot machine 100 comprises an upper light 110. The light 100 may be used, for example, to inform casino employees or other persons that a jackpot has been won at the slot machine 100 or that change is needed at the slot machine 100.

The slot machine 100 further comprises an upper portion 115 that may be used to display a payout schedule for one or more games playable on the slot machine 100. The upper portion 115 may comprise an electronic display that may be updated based on a signal from a processor or static information painted on glass or another surface.

The slot machine 100 further comprises a middle portion 120 that includes one or more reels. The reels, as illustrated in the FIG. 1, may be of a circular shape such that a curve of each of the reels protrudes toward a player of the slot machine. In one or more embodiments of the present invention each of the reels comprises one or more display devices on which indicia defining an outcome are displayed. The one or more reels may be located behind a transparent glass partition.

The slot machine further comprises a handle 125 that a player may pull to initiate a game at the slot machine 100. For example, pulling on the handle 125 may initiate a rotation of the reels.

The slot machine 100 further comprises a panel 130 that includes various buttons and devices operable to facilitate game play at the slot machine 100. For example, the panel 130 may include a device into which a player may insert a player tracking card, a device into which a player may insert coins or tokens as payment for a game, a start button, a plurality of buttons via which a player may indicate selections relevant to playing a game (e.g., which game the player desires to play, a wager amount, etc.), and a display that indicates a player's current balance of credits available for wagering on games at the slot machine.

Slot machine 100 further comprises a lower portion 135. The lower portion 135 may include various components, such as a coin tray for dispensing coins to a player as a result of a payout won for a game of the slot machine 100 and an access door which casino personnel can use to access the interior of the slot machine 100.

Figure 2:
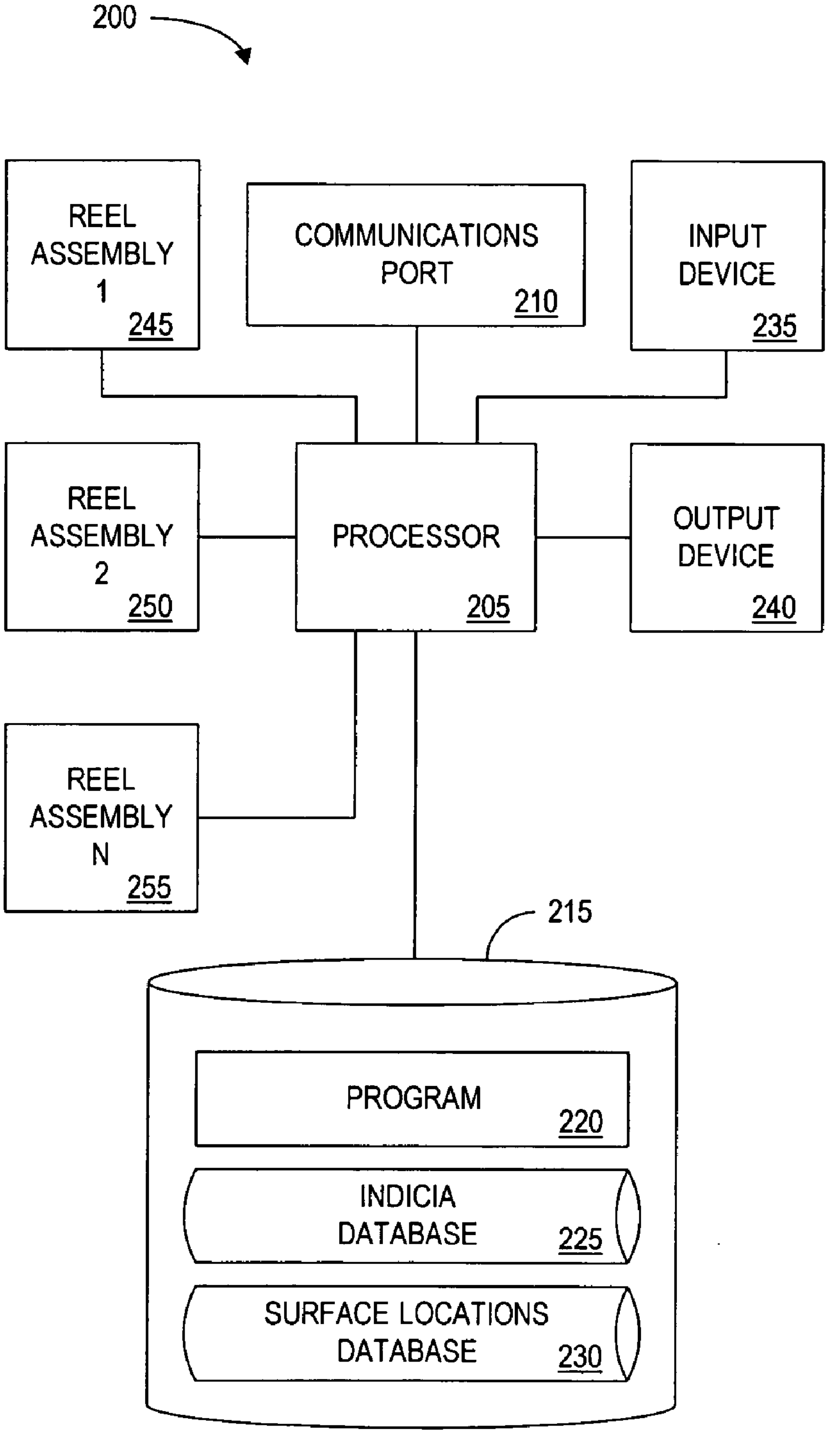
FIG. 2 is a block diagram of a slot machine, in accordance with one or more embodiments.

Referring now to FIG. 2, illustrated therein is a block diagram of an embodiment 200 of a slot machine. The slot machine may be implemented as a dedicated hardware circuit, an appropriately programmed general-purpose computer, or any other appropriate device including without limitation electronic, mechanical or electromechanical devices. Accordingly, the slot machine need not include the various components depicted in FIG. 2.

The slot machine of the illustrated embodiment comprises a processor 205, such as one or more Intel® Pentium® microprocessors. The processor 205 is in communication with a communications port 210 and a data storage device 215. The communications port 210 allows the slot machine to output data to another device and to receive data from another device. The data storage device 215 comprises magnetic memory, optical memory, semiconductor memory or any combination thereof. The data storage device 215 may include, for example, Random Access Memory (RAM), Read-Only Memory (ROM), a compact disc and/or a hard disk. The processor 205 and the data storage device 215 may each be, for example: (i) located entirely within a single computer or computing device; or (ii) connected to each other by a remote communication medium, including without limitation a serial port cable, a telephone line, a network connection or a radio frequency transceiver. In some embodiments, the slot machine may comprise one or more computers that are connected to a remote server computer for maintaining databases.

The data storage device 215 stores a program 220 for controlling the processor 205. The processor 205 performs instructions of the program 220, and thereby operates in accordance with the present invention, and particularly in accordance with the methods described in detail herein. The program 220 may be stored in a compressed, uncompiled and/or encrypted format, as well as in a variety of other forms known in the art. The program 220 furthermore includes program elements that may be necessary, including without limitation an operating system, a database management system and "device drivers" for allowing the processor 205 to interface with peripheral devices. Appropriate program elements are well known to those skilled in the art, and need not be described in detail herein.

According to an embodiment of the present invention, the instructions of the program 220 may be read into a main memory from another computer-readable medium, such as into RAM from a hard drive or ROM. Execution of sequences of the instructions in program 220 causes processor 205 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The program 220 may also store instructions on conducting one or more games on the slot machine 200. For example, the program 220 may include various subroutines executed during a particular game. Alternatively, the instructions for conducting the game may be separate from the program 220 for controlling the processor 205 in accordance with embodiments of the present invention.

The term "computer-readable medium" as used herein refers to any medium that participates in providing instructions to processor 205 (or any other processor of a device described herein) for execution. Such a medium may take many forms, including but not limited to, non-volatile media, volatile media, and transmission media. Non-volatile media include, for example, optical or magnetic disks, such as data storage device 215. Volatile media include dynamic random access memory (DRAM), which typically constitutes the main memory. Transmission media include coaxial cables, copper wire and fiber optics, including the wires that comprise a system bus coupled to the processor 205. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor 205 (or any other processor of a device described herein) for execution. For example, the instructions may initially be borne on a magnetic disk of a remote computer. The remote computer can load the instructions into its dynamic memory and send the instructions over a telephone line using a modem. A modem local to a slot machine 200 (or another device) can receive the data on the telephone line and use an infrared transmitter to convert the data to an infrared signal. An infrared detector can receive the data carried in the infrared signal and place the data on a system bus for processor 205. The system bus carries the data to main memory, from which processor 205 retrieves and executes the instructions. The instructions received by main memory may optionally be stored in data storage device 215 either before or after execution by processor 405. In addition, instructions may be received via communications port 210 as electrical, electromagnetic or optical signals, which are exemplary forms of carrier waves that carry data streams representing various types of information. Thus, the slot machine 200 may obtain instructions in the form of a carrier wave.

The data storage device 215 also stores databases which store data accessible by the processor 205 and for use in performing the process steps described herein. The data storage device 215 stores (i) the indicia database 225, and (ii) the surface locations database 230. Each of these databases is described in detail below. Additional or different databases may be used. The data stored in these databases may instead be stored in a single database or in a location different from the slot machine.

Note that, although databases 225 and database 230 are described as being stored in a slot machine 200, in other embodiments of the present invention some or all of these databases (or some or all of the data stores therein) may be partially or wholly stored in another device, such as a controller that controls a plurality of slot machines or a casino server. In one or more embodiments, there may be whole or partial duplication of data that is stored in a database of slot machine 200 and a database of another device.

The processor 205 may also be in communication with one or more input devices 235 and one or more output devices 240.

Examples of input devices include: (i) a button; (ii) a touch screen; (iii) a handle; (iv) a player tracking card device, which performs functions related to player tracking cards, such as reading player tracking cards and communicating information read from such cards to the processor 205 (typically, information read from such cards includes unique player identifiers, such as a sequence of digits or a sequence of alphanumeric characters); (v) a ticket reader, which is capable of reading tickets and particularly indicia registered on tickets and like material; and (vi) a credit card reader which generally allows a card such as a credit card or debit card to be inserted therewithin and information to be read therefrom.

Examples of output devices include: (i) a cash dispenser, which dispenses coins and/or bills to players that have requested to have funds be dispensed; (ii) a ticket printer, which may be commanded to print onto a substrate, such as paper or other material; and (iii) a display screen, such as a liquid crystal display, a plasma display and a video display monitor (e.g., for displaying information such as payout schedules and instructions for playing the game).

Processor 205 is also in communication with a plurality of reel assemblies 245, 250, and 255. Although three reel assemblies are shown, any number of reel assemblies may be used. A reel assembly may comprise a reel and other components related to operation of the reel. For example, one or more of the following may comprise a reel assembly: (i) one or more components for moving the reel (e.g., a stepper motor and/or a power supply), (ii) one or more components for tracking the surface locations of the reel (e.g., an index wheel and/or a reel position detector), and (iii) a component for stopping the reel (e.g., an index arm and an index arm controller). A reel is a cylindrical surface that typically rotates about an axis and on the outer periphery of which are typically displayed indicia that define an outcome for a game. A typical shape of a reel is described in more detail with respect to FIG. 3A, below.

In some embodiments, the slot machine 200 may comprise components in addition to those depicted in FIG. 2. For example, in embodiments where payment is received and/or dispensed by the slot machine 200, the processor 205 may also be in communication with a payment system (not shown). The payment system may be a component of the slot machine 200. The payment system may comprise a device capable of accepting payment from a player (e.g., a bet or initiation of a balance) and/or providing payment to a player (e.g., a payout). Payment is not limited to money, but may also include other types of consideration, including products, services, and alternate currencies.

Exemplary methods of accepting payment by a payment system of slot machine 400 include (i) receiving hard currency (i.e., coins or bills), and accordingly the payment system may comprise a coin or bill acceptor; (ii) receiving an alternate currency (e.g., a paper cashless gaming voucher, a coupon, a non-negotiable token), and accordingly the payment system may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity.

In one or more embodiments, the slot machine 200 may be operable to output a benefit to a player. In such embodiments, the processor 205 may also be operable to communicate with a benefit output device (not shown). The benefit output device may be a component of slot machine 200. The benefit output device may comprise one or more devices for outputting a benefit to a player of the slot machine. For example, in one embodiment the slot machine 200 may provide coins and/or tokens as a benefit. In another example, the slot machine 200 may provide a receipt or other document on which there is printed an indication of a benefit (e.g., a cashless gaming receipt that has printed thereon a monetary value, which is redeemable for cash in the amount of the monetary value). In yet another example, the slot machine 200 may provide electronic credits as a benefit (which, e.g., may be subsequently converted to coins and/or tokens and dispensed from a hopper into a coin tray). In yet another example, the slot machine 200 may credit a monetary amount to a financial account associated with a player as a benefit provided to a player. The financial account may be, for example, a credit card account, a debit account, a charge account, a checking account, or a casino account. In such an embodiment the benefit output device may comprise a device for communicating with a server on which the financial account is maintained.

In one or more embodiments, a player may remotely operate a slot machine, possibly by using a telephone, PDA or other device (i) to transmit commands (directly or indirectly) to the slot machine, such as wager amounts and commands to select certain cards; and/or (ii) to receive output (directly or indirectly) from the slot machine.

The slot machine 200 may allow a player to play a game of skill, a game of chance, or a game that combines elements of skill and chance. In embodiments where the slot machine 200 allows the player to play games of chance, the slot machine 200 may further be operable to communicate with a random number generator (not shown), which may be a component of slot machine 200.

Figure 3A:
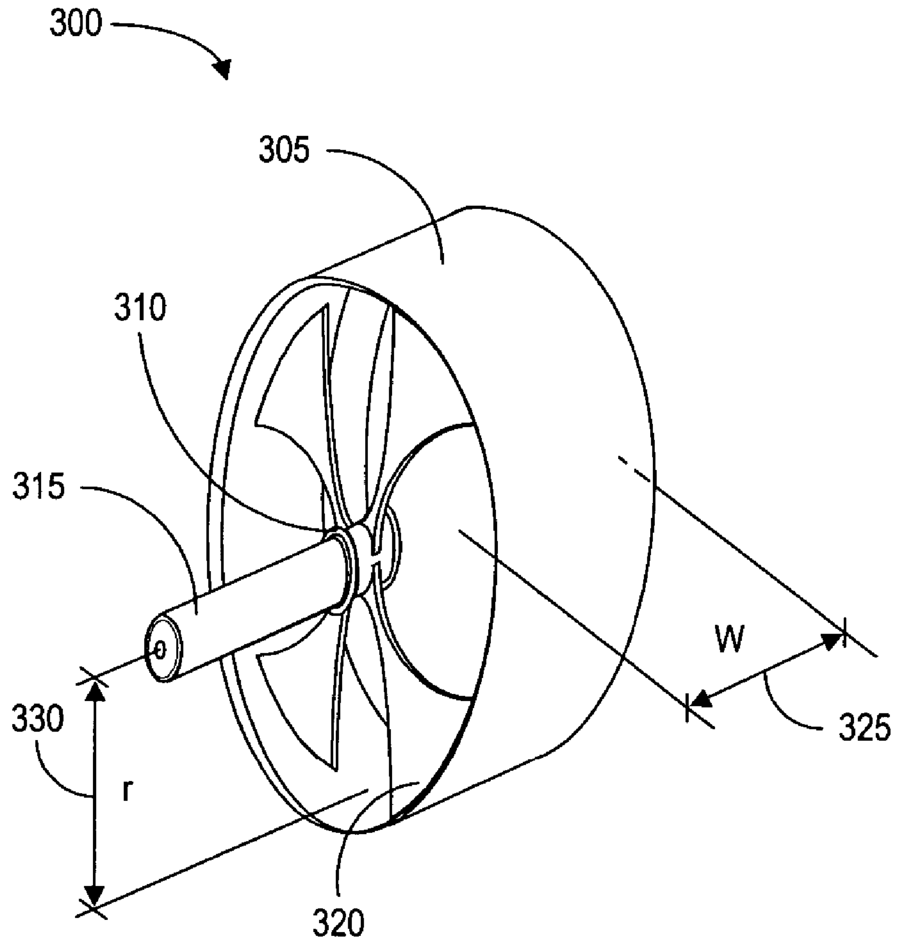
FIG. 3A PRIOR ART
FIG. 3A is a diagram of one conventional shape of a reel, which may be used in one or more embodiments of the present invention.

Referring now to FIG. 3A, illustrated therein is a diagram of an embodiment 300 of a reel shape. In the embodiment 300, a reel shape comprises a cylindrical surface 305 with a substantially convex outer first surface and a substantially concave inner second surface. Note that "substantially concave" and "substantially convex" refer to the general curvature of the cylindrical surface 305, relative to the entire expanse of the cylindrical surface. For example, the outer first surface does not have to be entirely convex to be within the scope of the present invention. Embodiments where the substantially convex outer first surface includes additional curvature along portions of the first surface (e.g., thus making the outer first surface appear bumpy or wavy, yet still substantially convex) are within the scope of the present invention.

Note that, in one or more embodiments, a reel shape may be a solid cylindrical shape. In such an embodiment, the reel shape does not have the substantially concave inner second surface but does have the substantially convex outer first surface.

Note further that the term "reel" as used herein refers to any surface formed by one or more display devices or any surface along which the one or more display devices may be located (e.g., any surface by which the one or more display devices may be supported), as well as any additional components that may be considered desirable to be included on, along the surface, or near the surface (e.g., a rim, as described with respect to FIG. 7, below, and/or one or more display memories, as described with respect to FIG. 3B, below). The term "reel assembly" is used interchangeably with the term "reel".

The cylindrical surface 305 can be of a straight cylindrical shape or an oblique cylindrical shape. Moreover, the cylindrical surface 305 may have a fixed radius "r" 330. In other words, any cross section which is perpendicular to the longitudinal axis of the cylinder (i.e., parallel to a base) is a circle. In other embodiments, the cylindrical surface 305 may have a varying radius. In other words, any cross section which is perpendicular to the longitudinal axis of the cylinder (ie., parallel to a base) is, for example, an ellipse. Note that the cylindrical shape comprises a respective base on each end, such that the left edge of the cylinder is the perimeter of the left base of the cylinder and the right edge of the cylinder is the perimeter of the right base of the cylinder.

In accordance with one or more embodiments, as will be explained in more detail below, one or more display devices may be shaped such that the left edge of the one or more display devices takes the form of at least a portion of the perimeter of the left base of a cylindrical shape and the right edge of the one or more display devices takes the form of at least a portion of the perimeter of the right base of the cylindrical shape. The one or more display devices may thus simulate the shape of a reel, at least as viewed from one or more viewing perspectives (e.g., as viewed by a player facing the slot machine that includes the one or more display devices).

The cylindrical surface 305 has a side of width "W" 325 that defines the distance from the center of a left base of the cylindrical surface to the center of a right base of the cylindrical surface. In one or more embodiments, a width "W" of a reel shape is a width sufficient to display at least one indicia that defines an outcome of a game (e.g., between two and five inches).

The substantially convex outer first surface defines an outer periphery of the reel. In mechanical reel slot machines, a reel strip (made of, e.g., plastic or laminated paper) is placed along the outer periphery of the reel. A reel strip has printed thereon a plurality of indicia. In embodiments of the present invention, as described in detail elsewhere herein, one or more display devices may be located along (e.g., mounted upon or attached to) the outer first surface of a reel. For example, a single long flexible display may be "wrapped" around the outer first surface of a reel. In another example, a plurality of rigid or semi-rigid display devices (e.g., LED devices) may be located (e.g., attached) along the outer first surface. In other embodiments, one or more display devices may be the outer first surface of a reel. In other words, rather than the outer first surface being formed of another material (e.g., metal, plastic or fiberglass) and having display devices attached to or otherwise located along this material, the one or more display devices may form the outer first surface without another material or component serving as a base underneath.

Note that being located "along" the cylindrical surface 305 or outer first surface of the cylindrical surface 305 may comprise, for example, being located on the substantially convex outer first surface of the cylindrical surface, or adjacent to the perimeter of a base of the cylindrical surface. Note further that the one or more display devices may be mounted on or attached to the supporting cylindrical surface (permanently or removably). For example, the one or more display devices may be attached in a manner that allows a particular display device or particular portion of a display device to remain at a particular surface location of the cylindrical surface while at the same time being easily removable from the cylindrical surface for maintenance purposes. In one or more embodiments, being located along the outer first surface means being embedded within the outer first surface (e.g., such that the face of the display device is flush or substantially flush with the outer first surface).

Note that, in addition to the reel shape, other components of a typical reel are illustrated in FIG. 3A. The substantially concave inner second surface defines a circular cavity (a "first" cavity). In some embodiments, the first cavity of the cylindrical surface 305 may include an interior cylindrical surface 310 which in turn has a substantially convex outer first surface and a substantially concave inner second surface. The substantially concave inner second surface of the interior cylindrical surface 310 defines a second cavity through which is fitted a shaft 315. One or more spokes 320 connect the cylindrical surface 305 to the interior cylindrical surface 310. Thus, when the interior cylindrical surface 310 rotates about the shaft 315 (e.g., via a bearing assembly), the cylindrical surface 305 is caused to be rotated about the shaft 315 as well.

Figure 3B:
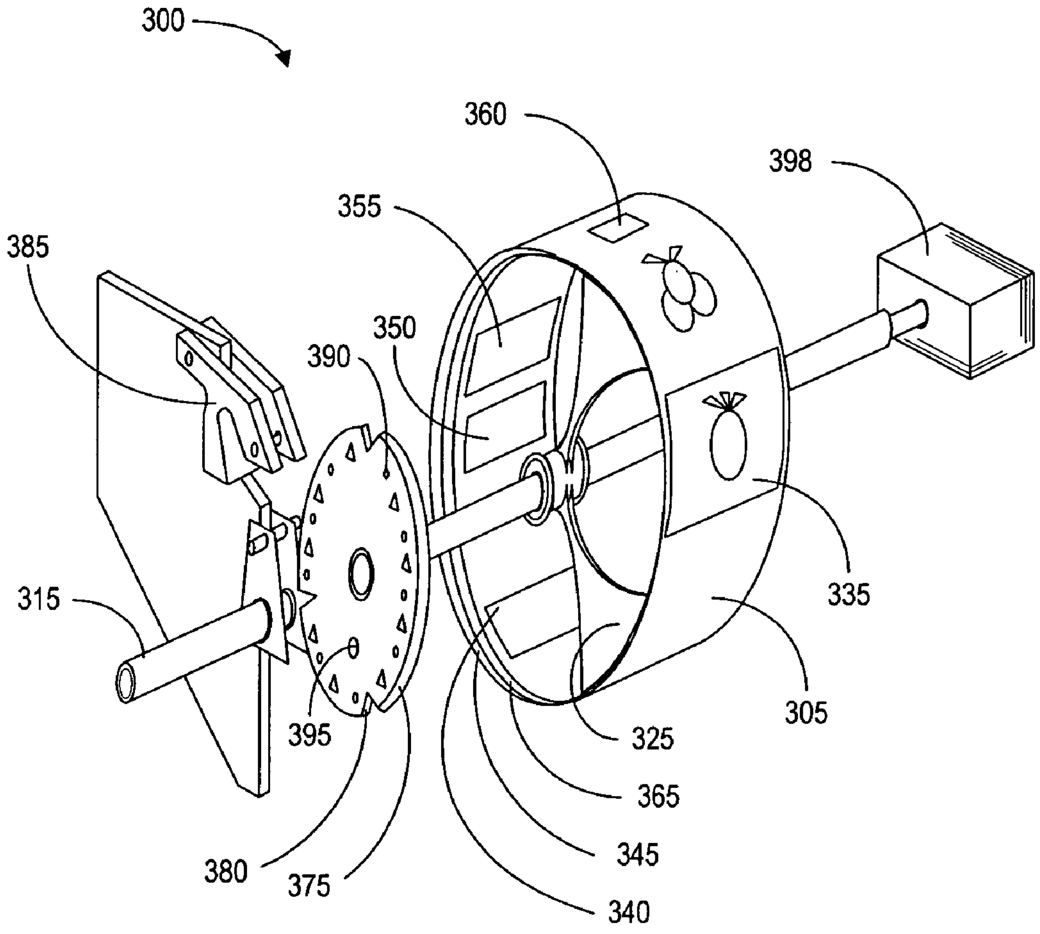
FIG. 3B is a plan view of one embodiment of a reel assembly.

Referring now to FIG. 3B, an embodiment of a reel assembly in accordance with one or more embodiments of the present invention is illustrated. A reel comprising a cylindrical surface 305 is illustrated. As illustrated, the outer first surface of the cylindrical surface 305 may include one or more display devices 335 (e.g., attached to or embedded in the cylindrical surface 305). The display devices may be, for example: (i) electroluminescent screens; (ii) gas discharge displays; (iii) liquid crystal displays, including liquid crystal displays that are painted directly on the outer surface; (iv) cathode ray tube displays; (v) plasma screens; (vi) light emitting diode (LED) displays; and/or (vii) flexible displays such as light emitting polymer displays (e.g., organic light emitting diode (OLED) displays). Note that OLED displays are one example of flexible displays. One advantage of using flexible displays to implement embodiments of the present invention is that they may be conformed to the to curvature of the reel. However, displays need not necessarily conform to the curvature of the reel. For example, a flat and rigid or semi-rigid display may simply be affixed to the outer surface of the reel. For example, the reel may comprise multiple surface locations, each surface location being defined by a display.

In one or more embodiments, each display device 335 may be operable to display a single indicium at a time. However, in other embodiments, a single display device 335 may display multiple indicia. For example, a single display device 335 may span one-hundred-and-eighty degrees of arc of the reel, and may display six different indicia, spaced at intervals of thirty degrees along the circumference of the cylindrical surface 305. A single display device 335 (e.g., a flexible and long display device) may even span the entire circumference of the cylindrical surface 305.

The substantially concave inner second surface of the cylindrical surface 305 may contain one or more display memories 340. In one embodiment, a single display memory 340 is associated with each display device 335. The display memory 340 associated with a display device 335 may be located at the same angular surface location as the display device 335, the display memory 340 being located on the inner second surface of the cylindrical surface 305 while the associated display device 335 is located on the outer first surface. Alternatively, a display memory 340 may be a component of a display device 335, or may be located between the outer first surface and a display device 335 (e.g., may be embedded in an inner layer of the cylindrical surface 305). Note that a surface location of the cylindrical surface 305 is a particular portion, defined by one or more predetermined boundaries, of the outer periphery of the cylindrical surface 305.

A display memory 340 may be electrically coupled to, or otherwise in communication with, its corresponding display device 335. As described in detail below, a display memory 340 may store information about indicia that can be displayed on a display device 335. In some embodiments, a single display memory 340 is in communication with (e.g., electrically coupled to) multiple display devices 335, and may store information about indicia to be displayed on the multiple display devices 335. In one embodiment, a display memory 340 may comprise a central memory of a slot machine (e.g., the data storage device 215 of FIG. 2) and may not be a component of the reel assembly 300. Such a centralized display memory may store, for example, information about all indicia available for display on any of the display devices of the slot machine. In yet another embodiment, a display memory 340 storing information about indicia to be displayed on a display device 335 of a slot machine may be at a location remote from the slot machine (e.g., a display memory 340 may be stored in a computing device such as a slot server of a casino or a computer controlling a plurality of slot machines).

A display memory 340 may comprise magnetic memory, optical memory, semiconductor memory or any combination thereof. For example, a display memory 340 may include RAM, SRAM (static RAM), DRAM (dynamic RAM), SDRAM (synchronous DRAM), ROM, PROM (programmable ROM), EPROM (erasable PROM), and/or EEPROM (electrically erasable PROM).

A display memory 340 may store data about one or more indicia. For example, a display memory 340 may store a first bit map for a cherry symbol, and a second bit map for an orange symbol. In one embodiment, a respective display memory 340 is associated with one or more predefined angular surface locations of a display device 335 or a predefined display device 335. In such an embodiment, the respective display memory 340 may store a plurality of indicia available for display at the one or more predefined angular surface locations or on the predefined display device. Accordingly, a processor (e.g., processor 205 or reel processor 355) may direct the display device 335 as to which of the available indicia stored in the display memory 340 to display. Note that the processor may select which of the available indicia are to be displayed based on one or more rules, which will be described in detail below. Accordingly, a means for selecting which at least one indicium to display at a predefined angular surface location of a display device or on a display device may comprise a processor programmed to execute a program for making the selection. For example, the processor may be programmed to access a database of rules for making such a selection or to recognize a signal from another processor (e.g., a processor of a casino server or of a handheld device of a casino employee) as to which at least one indicium is to be displayed.

In one embodiment, the at least one indicium displayed at a predefined angular surface location of a display device 335 or on a predefined display device 335 may be changed frequently (e.g., during a play of a game by a player, after every rotation of a reel, every few plays of a game). In other embodiments, the at least one indicium displayed at a predefined angular surface location of a display device 335 or on a predefined display device 335 may be changed relatively less frequently (e.g., when the casino desires to change or update the indicia for a game or use the reels of the slot machine to display indicia for another game, thus changing the game playable on the slot machine).

In one or more embodiments, a slot machine may be programmed with more than one game. For example, a player may choose which of three available games to play. In such embodiments, a display memory 340 may store a plurality of sets of indicia, each set corresponding to one of the available games. Also, in such embodiments, the indicia displayed at the angular surface locations of a display device of the slot machine or on a display device of the slot machine may change in response to the player's selection of the game.

A display memory 340 may comprise logic for transmitting indicia data to a one or more display devices 335, for receiving instructions from a processor (e.g., processor 205 and/or reel processor 355) as to which indicia to have displayed, and for receiving new indicia images to load into memory.

A display memory 340 may cause at least one indicium to be displayed by a display device 355 by repeatedly transmitting data for the at least one indicium to the display device 355. For example, the display memory 340 may transmit data defining a first pixel of the indicium to the display device 355. In response, the display device 335 may stimulate the first pixel by means of, for example, an electron beam, in accordance with the transmitted data. The display device 355 may then transmit data defining a second pixel of the indicium, and the display device 335 may stimulate the second pixel. The process may repeat until data defining all pixels of the indicium has been transmitted to the display device 335. The display memory 340 may then once again transmit data defining the first pixel, causing the display device 335 to re-stimulate the first pixel.

In one or more embodiments, a display memory 340 may comprise read-only memory (ROM). In these embodiments, the display memory 340 may be unable to receive data defining new indicia, and may be unable to overwrite previously stored data defining indicia.

In some embodiments, display devices may be used to display video clips. For example, display devices may display clips associated with a bonus round. In another example, display devices may show video clips from movies, television shows, or sporting events. The entertainment provided by the video clips may serve as a bonus to the player. In these embodiments, a display memory 340 may store moving image data in, for example, MPEG format. The display memory 340 may then transmit the moving image data to one or more display devices 335 in order to have displayed the moving images.

In one or more embodiments, the reel may further comprise one or more power strips 345, such as metal wires or other conducting material, that encircle the cylindrical surface 305, forming closed circular loops. Power strips may be located, for example, (i) along the outer first surface of the cylindrical surface 305, (ii) along the inner second surface of the cylindrical surface 305, and/or (iii) alongside an edge of the cylindrical surface 305 (e.g., forming the perimeter of a base of the cylindrical surface). In one or more embodiments, one or more of the power strips 345 may penetrate the cylindrical surface 305, so as to be exposed on both the exterior of the outer first surface and the exterior of the inner second surface of the cylindrical surface 305. As will be described, the one or more power strips 345 may transmit electrical power and electrical signals to the display devices 335 and/or to the display memories 340.

In one or more embodiments, a reel may further comprise a battery 350 or other attached power source for powering the one or more display devices 335 and/or the one or more display memories 340. In other embodiments, the source of power is external to the reel. Note that, although the battery 350 is illustrated as being located along the inner second surface of the cylindrical surface 305, other locations are within the scope of the present invention. For example, a battery 350 may be embedded within the cylindrical surface 305 or may be a component of another device (e.g., a component of a display device 335). Note further that, although only a single battery 350 is illustrated, a reel may comprise any number of batteries.

In one or more embodiments, a reel comprises a reel processor 355. The reel processor 355 may provide data (e.g., instructions) to, and receive data from, other components of the reel. The reel processor 355 may also receive data (e.g., instructions) from another processor of the slot machine (e.g., from processor 205 of slot machine 200). One advantage of having a separate reel processor is that components of a reel may be issued complex instructions while the reel is moving. Another processor that is external to the reel may have more difficulty issuing complex instructions to the reel, as the communications interface between the moving reel and either other components of the slot machine or another device may not allow for high bandwidth communication. Therefore, in some embodiments, while a reel is stationary, another processor of the slot machine may issue instructions to a reel processor 355, to be executed when the reel is set in motion. The reel processor 355 may then issue such instructions to the reel components at the appropriate times.

In one example, the reel processor 355 may receive reel position data from one or more photo-sensors 360. The photo-sensors 360 may, for example, be attached to the outer first surface of the cylindrical surface 305. As the cylindrical surface 305 rotates, the photo-sensors 360 pass in front of a fixed reference light source (e.g., a laser). The light source may be, for example, attached to a stationary portion of the slot machine and direct light in a fixed path that is intermittently (as the reel rotates) intercepted by a photo-sensor 360. The one or more photo sensors 360 may be in communication with the reel processor 355 (or another processor of the slot machine). When, based on the detection by the photo-sensors 360, the reel processor determines that the reel has reached a predetermined angular position, the reel processor 355 may instruct a display memory 340 to cause its corresponding display device 335 (which may now be out of view of the player) to change its displayed symbol.

As described above, in one or more embodiments, an electrical power source for a reel may be external to the reel assembly. In such embodiments, electrical power may be transmitted from the power source to the reel via a reel power port (not shown). The reel power port may comprise, for example, a wire brush. The wire brush may contain a number of fine, flexible, metal bristles capable of continuous contact with a moving surface while not significantly impeding the motion of the surface. Thus, a fixed wire brush may be in contact with a first power strip of the one or more power strips 345. In one embodiment, as the reel rotates, the first power strip is in continuous contact with the wire brush, since the first power strip encircles the cylindrical surface 305. The fixed wire brush may transmit a fixed voltage to the first power strip. For example, the wire brush may maintain a constant voltage of five volts. Therefore, the first power strip is maintained at five volts. A second wire brush may maintain a second power strip at ground, or zero volts. The electronics contained on the reel may thereby utilize the five-volt first power strip and the grounded second power strip to power their circuitry. In some embodiments, more than two voltage differentials are required to power the electronics of a reel. For example, a display device 335 may require a ten-volt differential, while the display memory 440 may require only a five-volt differential. In this case, there may be three power strips maintained at different voltages, one strip at 10 volts, one strip at 5 volts, and one strip at ground.

It will be appreciated that there are many other ways of transmitting electrical power to a reel. For example, fixed electromagnets may create a magnetic field within the slot machine. Then, as metal components of the reel are rotated through the magnetic field, electric currents may be generated within the reel. Such electric currents may be used to power the electronics contained on the reel.

In embodiments where the reel includes a power source, such as a battery 350, the power source included on the reel may be periodically recharged using, for example, an external power source. For example, when the reel is stationary, an external power source may be coupled to the power source included on the reel so as to recharge the power source included in the reel assembly.

In one or more embodiments, fixed portions of the slot machine may generate light and/or heat (e.g., through a metal filament with high electrical resistance, through which a high current is passed). A source of the light and/or heat may be located close to the reel. In such embodiments, a component of the reel may comprise one or more photo-voltaic cells which pick up the light and/or heat and convert it to energy for powering the reel.

In one or more embodiments, a reel assembly may comprise one or more fuel cells for supplying power to the electronic components of the reel assembly. In such embodiments, as the supply of fuel (e.g., hydrogen) is used up, the supply may be replenished when the reel is stationary. For example, a nozzle can be extended from a fixed portion of the slot machine to a fuel reservoir that is a component of the reel assembly.

In one or more embodiments, signals are transmitted to the reel. The signals may be used, for example, to instruct a display device 335 to display a different indicium than it is currently displaying.

In one or more embodiments, the reel assembly 300 may comprise a signal bus 365. For example, one or more power strips may serve as the signal bus 365. The reel processor 355 or another processor of the slot machine may be in communication with the signal bus 365 via a reel communications port (not shown). The reel communications port may comprise, for example, wire brushes in contact with the conducting strips that serve as the signal bus 365. The reel communications port may additionally comprise a signal amplifier to amplify the signal from a processor (e.g., processor 205 or reel processor 355) before the signal is transmitted to the reel. The wire brushes may alternately charge the one or more power strips 345 to either of two voltages. The higher voltage may represent a "1", and the lower voltage a "0". Through various combinations of voltages applied to multiples strips, or through various sequences of voltages applied to one or more strips, individual display devices 335 or display memories 340 may be addressed and given instructions. For example, the fifth of eight display memories 340 may be accessed by charging three power strips to form the bit sequence "100". The same display memory 340 may then be instructed to cause its corresponding display device 335 to display the third of four stored indicia, by alternately varying the charge on a fourth power strip to form the bit sequence "10".

In one or more embodiment, the reel communications port may transmit optical signals to the moving reel. For example, one or more fixed lasers may be aimed at the outer first surface of the cylindrical surface 305. As described above, the cylindrical surface 305 may comprise one or more photo-sensors 360 for sensing the laser light. When a photo-sensor 360 passes in front of a laser, the laser may be either on or off. Whether the laser is on or off may thereby provide a signal to the reel. In some embodiments, when a photo sensor 360 passes in front of a laser, the laser may be switched on and off multiple times in a distinctive pattern, which may provide a more information-rich signal to the reel. In one embodiment, a first photo sensor always passes in front of a first fixed laser at the same time that a second photo sensor passes in front of a second fixed laser. The first fixed laser is always on, while the second fixed laser may be either on or off. In this way, it is known when the second photo sensor is in front of the second laser, even when the second laser is off. The "off" signal can thereby be distinguished from times when the second photo sensor is not in front of the second laser.

In one or more embodiments, an optical signal need not be transmitted via laser. Rather, diodes, incandescent lights, neon lights, or other light or radiation sources may be used to transmit optical signals.

In one or more embodiments, a signal is wirelessly transmitted from one or more fixed transmitters to one or more antennae (not shown) attached to the reel. For example, signals may be transmitted from fixed portions of the slot machine to a moving reel via one or more antennae transmitting electromagnetic radiation. For example, the reel may contain a wire that runs along its substantially concave inner second surface, forming a circle or a semi-circle. Meanwhile, a fixed circular wire may run parallel to the inner second surface of the reel, forming a slightly smaller circle. Electric currents produced in the inner circular wire may induce electric currents in the outer circular wire of the reel. These induced currents may constitute signals that provide instructions to the various electronic devices may comprise the reel.

The aforementioned configuration of circular wires is just one of many possible antenna configurations. In another configuration, the reel contains a groove running along its inner second surface. A fixed circular, or near circular wire is situated within the groove, though not touching any part of the edge of the groove, so as not to cause friction and wearing. The fixed wire may carry electric currents and may thereby induce currents and signals in the surrounding metal (e.g., in embodiments where the reel itself is made of metal, or if the groove is lined with metal).

In another configuration, a loop of wire protrudes to the side of a spinning reel, so that the loop is moving in a circle with the reel, tracing out a volume in the shape of a donut. During each revolution, the loop of wire passes near a magnet attached to the fixed portion of the slot machine. The changing magnetic field lines passing through the loop as it passes by the magnet may induce a current, which may be interpreted as a signal. To vary the signal, the magnet may be extended and retracted towards and away from where the moving loop will pass, so as to vary the magnetic flux passing through the loop. Alternatively, the magnet may be an electro magnet, where the intensity of the magnetic field (and therefore the signals conveyed) may be varied by varying the amount of electricity fed to the electro magnet.

In one or more embodiments, signals may be transmitted to the reels via infrared or optical wavelengths, using well-known protocols. In one embodiment, a fixed receiver is located along the edge of the reel or along an inner second surface of the reel. An infrared transmitter is located along the axis of the reel (not attached to the reel). The direction in which the infrared transmitter is pointing can be rotated in synch with the reel, so that the infrared transmitter is always pointing towards the receiver. Signals may thereby be continuously transmitted to the reel.

In one or more embodiments, signals may be transmitted to the reels via the manner in which the reel is caused to spin. For example, the stepper motor of a reel, per instructions of a processor, may cause the reel to spin slightly faster to indicate a “1” and slightly slower to indicate a “0”. Thus, for example, a reel’s speed may vary from 1.00 revolutions per second to 1.05 revolutions per second. Such speed variations may be imperceptible to a human observer. However, accelerometers within the reels may detect the changes in speed, and may register such changes as signals to be conveyed to various electronic components of the reels.

Signals may also be transmitted to reels via physical contact between the reels and fixed portions of the slot machine. For instance, a reel may contain a button protruding slightly from its outer first surface. The fixed portion of the slot machine may, meanwhile, contain a small extendable and retractable arm. When extended, the arm will brush the button on the reel (thereby pressing it) as the button passes by during the reel’s motion. When the arm is retracted, the button will pass by without being pressed. Through the extension and retraction of the arm, signals may thereby be transmitted to the reels.

In one or more embodiments, signals may be transmitted to the reels via a magnetic medium. A write head attached to a fixed portion of the slot machine may write data to the magnetic medium. A read head, attached to the moving reel, may skim over the magnetic medium, picking up the data written by the write head. The magnetic medium may, for instance, form a planar surface that is parallel to the plane in which the reel rotates. The read head and write head may be on opposite sides of the magnetic medium, so as to avoid collisions between the two. Alternatively, either the read or write heads may be retractable, and one or the other may be retracted as the read head spins close to the write head during each revolution of the reel. Examples of magnetic media include those found in a computer hard disk, or a video or audio cassette tape.

In one or more embodiments, it may be possible and/or desirable to transmit a higher bandwidth signal to a reel when it is stationary than when it is moving. For example, when the reel is stationary, a more sturdy connection may be established by mechanically coupling a metal connector to a communication port on the reel. High bandwidth signals may then be transmitted to the reel via the connection. In embodiments involving optical signaling, a stationary reel allows a photo-sensor to remain continuously in front of a fixed laser, thereby allowing for higher bandwidth communication. High bandwidth connections may be desirable, for example, in loading new data (e.g., data defining indicia) into display memories. In contrast, the low bandwidth connections might only be used for telling a display memory which of several pre-stored indicia to have displayed.

In some embodiments, in order to begin high-bandwidth communication a reel must be rotated to a certain angular position, e.g., so a photo-sensor can be directly in front of a laser. Thus, for example, when a slot machine is not in use, the reels may be rotated into position for high bandwidth communication. Alternatively, after a player has generated an outcome, reels may be caused to stop in exactly the position to allow high bandwidth communication. Note that, regardless of which position the reel is stopped in, any desired outcome may be displayed to the player because the display device (or portion of a display device) that is stopped such that it is along the payline of the slot machine may be capable of displaying any desired indicium.

The reel may be attached to an index wheel 375, which lies in a plane substantially parallel to the plane of the reel. The index wheel may be attached to the reel via one or more connectors connected at one end to the inner cylindrical surface 310 of the reel, and at the other end to index wheel 375. Thus, the index wheel 375 rotates about the shaft 315 with the reel, and maintains its relative position to the reel even as both rotate. The index wheel 375 may contain one or more notches 380. A protrusion of an index arm 385 may fit into the notches 380 on the index wheel, stopping the rotation of the index wheel, and thereby stopping the rotation of the attached reel. The index wheel may contain at least one aperture 390 that allows the passage of light from a light source on one side of the index wheel 375 to a photo detector on the opposite side of the index wheel 375. Each aperture 390 on the index wheel may correspond to a particular display device 335 or a particular surface location of a display device 335. Thus, for example, when a particular aperture 390 is situated to allow the passage of light to a photo sensor 360, a corresponding and particular display device 335 may be at a particular angular position (e.g., in view of the player). At one particular distance from the center of the index wheel 375, there may be located a single aperture 395. Thus, when a photo sensor 360 detects light passing through the single aperture 395, it may transmit electrical pulses to a processor (e.g., reel processor 355 or another processor), communicating the angular position of the reel. This method of determining complete rotations of a reel is recognized by persons of ordinary skill in the art.

The reel assembly 300 may further comprise a means for moving the reel. The means for moving the reel also comprises the means for moving the one or more display devices. In some embodiment, as described, the one or more display devices 335 may be located along the supporting cylindrical surface 305 that is made of a different substrate (e.g., a metal). Thus, the means that moves the supporting cylindrical surface (the reel) also moves the one or more display devices located along it. In other embodiments, as also described, the one or more display devices 335 may form the cylindrical surface 305 without an additional supporting substrate. In such embodiments, the means for moving the reel described herein may be utilized to instead move the cylindrical surface 305 formed by the one or more display devices 335.

The means for moving the cylindrical surface 305 (and thus moving the one or more display devices 335) may comprise a reel controller. A reel controller may be, for example, a mechanical device, an electrical device, or a combination thereof. A reel controller may comprise, for example, a stepper motor 398 with associated logic. The stepper motor 398 may be operable to cause the shaft 315 to rotate, thus causing the reel to rotate. In another example, a reel controller may comprise a processor programmed to transmit electrical pulses that cause a reel to rotate. The reel controller may be operable to cause one or more reels to rotate by, for example, applying a torque to the shaft on which a reel is mounted. Each reel may have a separate reel controller, or one reel controller may control multiple reels. The reel controller may receive signals from the reel processor 355 (or another processor of the slot machine) to accelerate, decelerate, or maintain the angular velocity of associated reels. Note that the means for moving the reel may also comprise the power source for the reel, described above.

In one or more embodiments, other means for moving a reel (and thus the one or more display devices of the reel) may be utilized. For example, a reel may comprise permanent magnets of alternating polarities spaced along its outer first surface. A fixed electromagnet locate proximate to the reel may be operable to change its polarity at appropriate times, such that it is always repulsing the nearest permanent magnet of the reel, thereby causing the reel to move. Note that, in this embodiment, the reel itself may be part of a motor. In another embodiment, a reel may include sail-like surfaces along a perimeter and a wind source directed at the sail-like surfaces may cause the reel to move.

In one or more embodiments, the index arm 385 may include an index arm controller (not shown). An index arm controller may comprise, for example, a motor with associated logic. The index arm controller may be operable to move the index arm 385 into contact with the index wheel 375 so as to slow the rotation of the index wheel 375, thus stopping the index wheel 375 at a particular angular position by fitting the index arm 375 into a notch 380. The index arm controller may receive instructions from the reel processor 355 (or another processor of the slot machine) to, for example, move the index arm 385 into contact with the index wheel 375, to move the index arm 385 into a particular aperture 380 of the index wheel 375, or to move the index arm 385 away from the index wheel 375.

Figure 4:
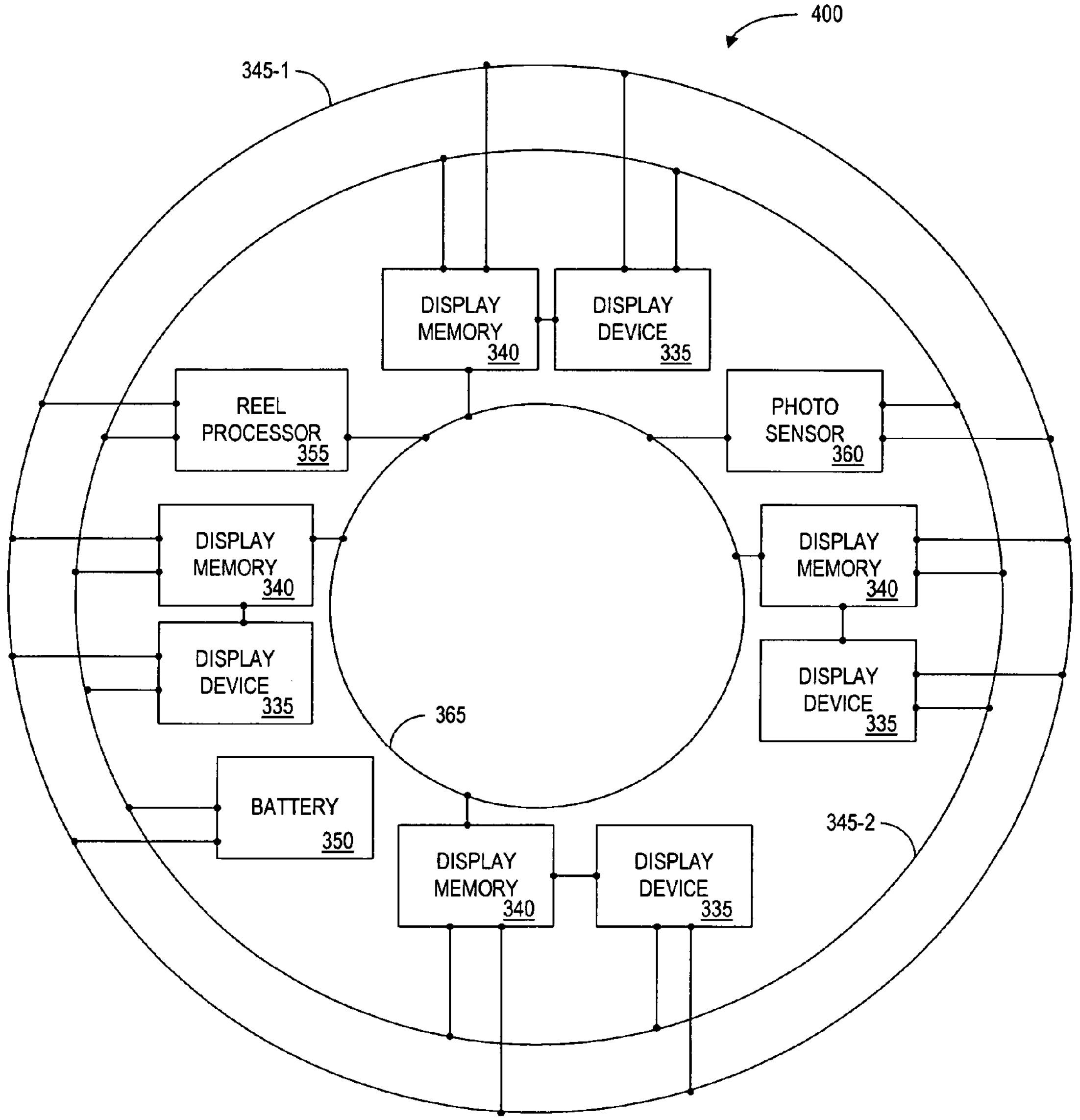
FIG. 4 is a schematic diagram of one embodiment of a reel assembly.

Referring now to FIG. 4, a schematic diagram of an embodiment 400 of a portion of the reel assembly 300. The embodiment 400 illustrates exemplary connections among some of the components of reel assembly 300. The embodiment 400 comprises a first power strip 345-1 and a second power strip 345-2. The embodiment 400 further comprises a signal bus 365. Attached to the first power strip 345-1, second power strip 345-2, and/or the signal bus 365 are various components of the reel assembly 300. For example, a plurality of display memories 340 and a plurality of display devices 335 are illustrated as being connected to the first power strip 345-1 and the second power strip 345-2. Each display memory 340 is further illustrated as being connected to a display device 340 and to a signal bus 365. A battery 350 is also illustrated as being connected to the first power strip 345-1 and the second power strip 345-2. Note that the first power strip 345-1 may be of a first voltage while the second power strip 345-2 may be of a second voltage, thus powering the battery. A reel processor 355 is also illustrated as being connected to the first power strip 345-1 and the second power strip 345-2. Finally, a photo sensor 360 is illustrated as being connected to the first power strip 345-1, the second power strip 345-2, and the signal bus 365.

Note that other connections are possible and additional components may be included. Further note that a single display device 335 and/or a single display memory 340 may be used.

Figure 5:
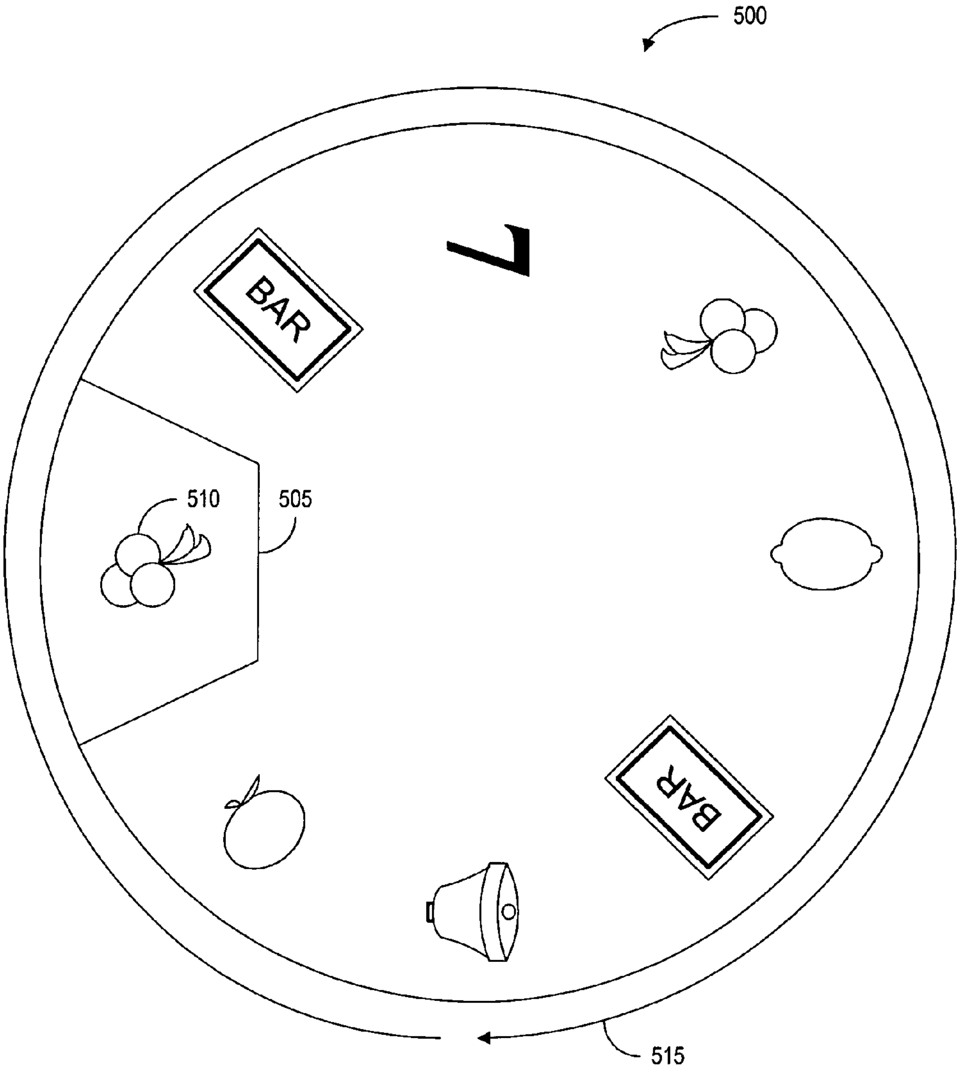
FIG. 5 is a diagram of one embodiment of a reel assembly.

Referring now to FIG. 5, an embodiment 500 of an alternate shape for a reel is illustrated. In the embodiment 500, a reel is in the shape of a flat or semi-flat circular disc. One or more display devices may be mounted on or attached to this disc-shaped reel. For example, a single display device that is also in the shape of a circular disc may be mounted on the supporting surface of the reel. In another example, a plurality of display devices may be attached to the supporting surface of the reel (e.g., along the perimeter of the reel). Alternatively, a display device in the shape of a circular disc may comprise the surface of the reel without being mounted on or attached to any additional supporting surface.

In the embodiment 500, a plurality of indicia are displayed along the perimeter of the reel. A viewing window 505 allows only a particular surface location of the reel to be viewed. In other words, only the at least one indicium 510 that is located at the surface location within the viewing window 505 is viewable by a player of the slot machine that includes the reel of embodiment 500. In one or more embodiments, more than one indicia may be viewable through the viewing window 505. The reel of embodiment 500 is rotated in the manner indicated by directional arrow 515 while the viewing window 505 remains stationary. In this manner, the respective indicium displayed in the viewing window 505 changes. However, the indicium at a particular surface location of the reel of embodiment 500 may further be changed since the indicium is displayed on a display device or particular surface location of a display device. Thus, for example, the indicium 510, when the reel is rotated such that the indicium 510 is no longer viewable through the viewing window 505, may be changed to a different indicium Note that the reel assembly using a reel in the shape of embodiment 500 may include many if not all of the same components as described with respect to embodiment 300. For example, the components described as being located on the inner second surface of cylindrical surface 305 may instead be located along the back surface (not shown, the surface facing away from the viewer of the disc shaped surface) of the circular disc shaped surface of embodiment 500. The components described as being embedded within the cylindrical surface 305 (between the substantially convex outer first surface and the substantially concave inner second surface) may instead by embedded within the circular disc shaped surface of embodiment 500.

Figure 6:
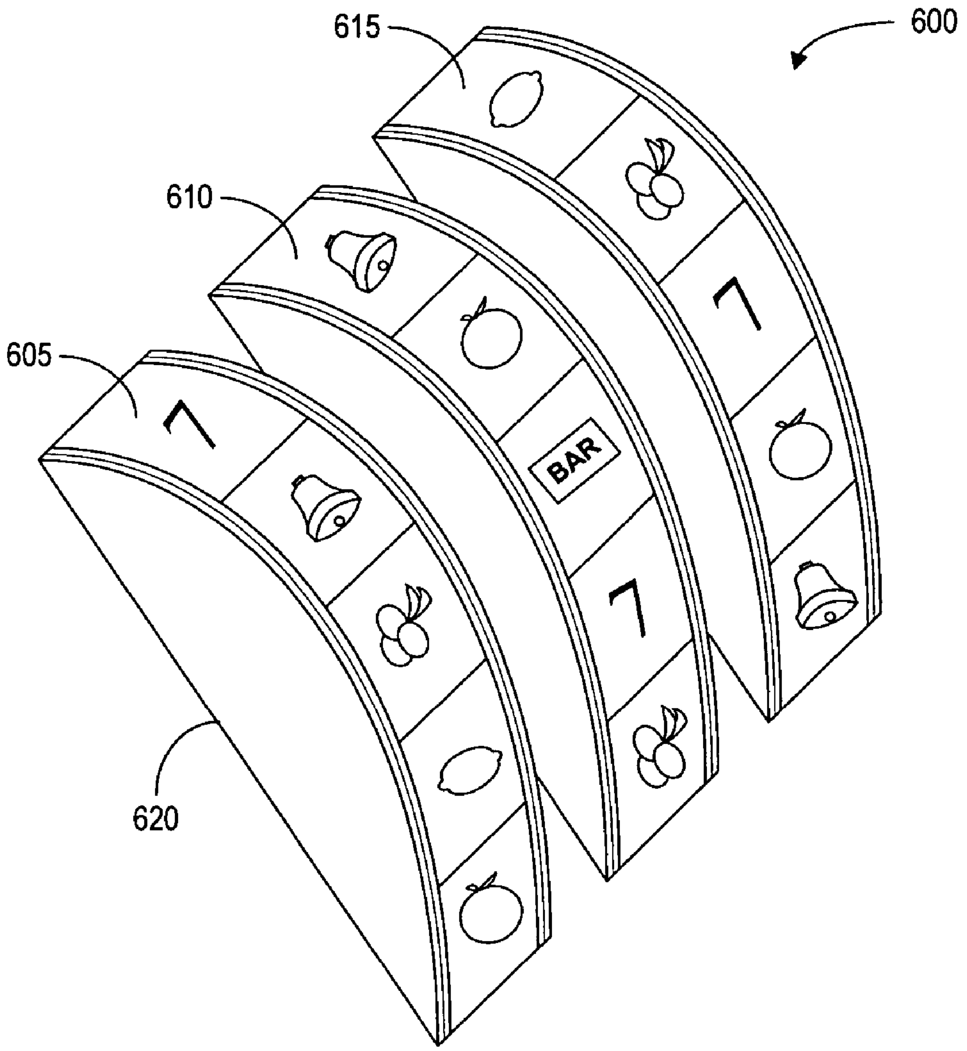
FIG. 6 is a plan view of a plurality of display devices that each have a curved shape resembling a portion of a shape of a reel, consistent with one or more embodiments of the present invention.

Referring now to FIG. 6, an embodiment 600 of a plurality of sets of one or more display devices 335 is illustrated. The embodiment 600 includes a first set 605 of display devices, a second set 610 of display devices, and a third set 615 of display devices. Although three sets of display devices are illustrated, any number of sets may be used. The three sets illustrated in embodiment 600 may be used, for example, in a slot machine with three reels or a slot machine that appears to have three reels. Each set of one or more display devices comprises at least one display device.

As described, in one or more embodiments, a display device for displaying indicia defining an outcome of a game may not necessarily move. However, to attain the benefit of attracting players who prefer to play mechanical reel slot machines, the one or more display devices comprising a reel may be shaped such that they resemble the shape of a reel. For example, a single display device may be curved so that vertical cross sections form semi-circles. The convex portion of the display device faces the player, so that the center of the display device is closest to the player, and its top and bottom portions are further away.

Unlike video slot machines, which depict images of a plurality of reels on a single flat or semi-flat display, in embodiments of the present invention one or more display devices are shaped like a reel to provide a player with the look and feel of a conventional mechanical reel slot machines. Thus, for a slot machine that appears to have a plurality of reels, a plurality of sets of display devices may be utilized, each set defining a shape of a reel. Each set of display devices may comprise at least one display device (e.g., a single flexible display device "wrapped" around the outer first surface) or a plurality of display devices (e.g., a plurality of LEDs). Since the display devices are operable to display different indicia at a particular surface location and further operable to display animated and complex graphics, the benefits of video slot machines may still be realized.

Even though the display devices of embodiment 600 do not move, a simulation of movement may still be achieved such that it appears to a player viewing the plurality of sets of one or more display devices that each of the sets is moving. In one embodiment, a set of one or more display devices may display an animated image of a spinning reel. For example, indicia may be depicted as moving from the top portion of the set of display devices to the bottom portion, and then disappearing, perhaps later reappearing on the top portion as if they had continued their motion behind the set of display devices. The reels of embodiment 600 appear more realistic than reels displayed on a flat screen, since the curvature of the display device mimics the curvature of physical reels.

Note that a single display device may comprise a set. For example, the set 605 may comprise a single display device that is curved to simulate the shape of a conventional reel or the portion of a conventional reel shape that is typically viewed by a player. For example, a flexible display may be curved on a supporting surface 620, the supporting surface 620 being shaped such that it resembles a portion of a cylinder (e.g., the portion of the cylindrical shape of a reel that a player typically views). In other embodiments, a plurality of display devices may be located along a supporting surface, or attached to one another without a separate supporting surface, to resemble the shape of a reel. For example, a plurality of small (e.g., four inches wide and four inches tall) LED displays may be attached to an outer periphery of a supporting surface in the shape of a portion of a cylinder. When viewed from the side, the LED displays may resemble an octagonal (due to the square shape of the LED displays) curve that is a portion of a cylinder. For example, a semi-circular cylindrical surface may lie with its axis parallel to the ground and perpendicular to a player's line of sight. Three flat display devices may be attached to or mounted on the cylindrical surface at different angular surface locations. A display device attached to a lower surface location may thus be facing slightly towards the ground, a middle display device may be facing parallel to the ground, and an upper display device may be facing towards the ceiling. Together, the three display devices represent a curved reel, even though each is flat. In another variation, multiple display devices may represent multiple reels. At any one time, each display device shows only a portion of each of the multiple reels. For example, a first display device shows the upper portion of each of three reels, a second display device shows the middle portion of each of three reels, and a third display device shows the lower portion of each of three reels.

In an alternate embodiment, a single display device may be shaped to simulate the curved portion of a reel typically viewed by a player. The single display device may display images of a plurality of reels thereon.

Figure 7:
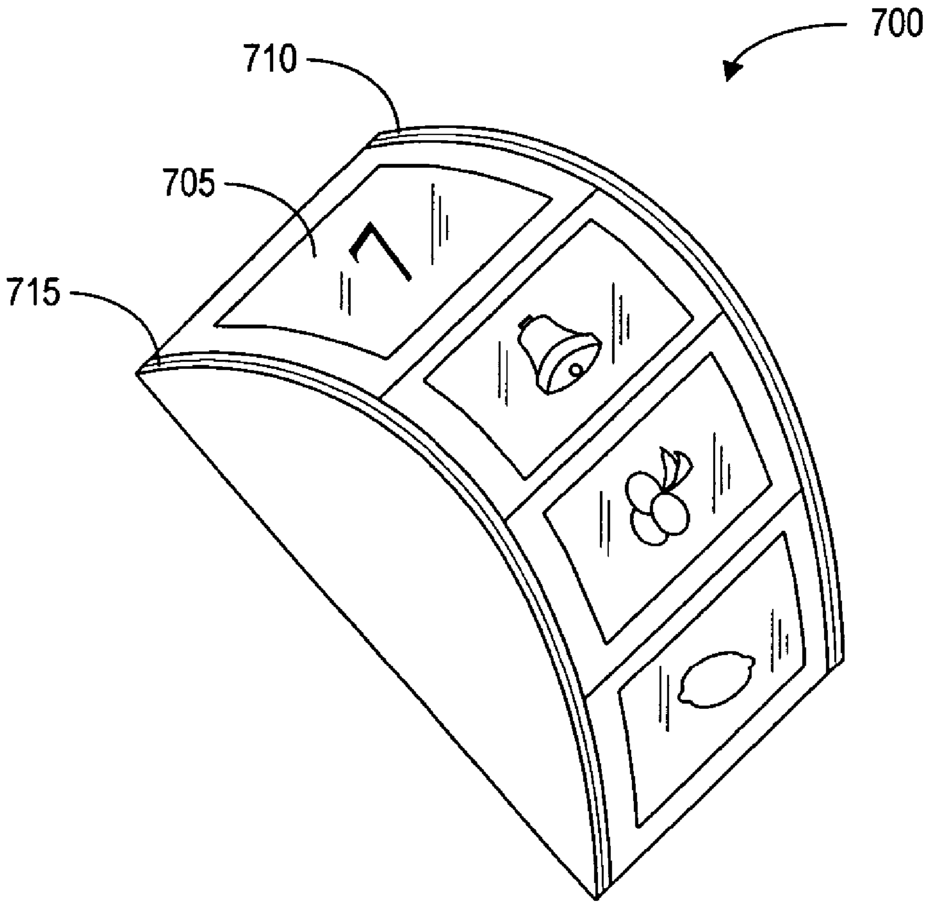
FIG. 7 is a plan view of a display device assembly that includes two rotating surfaces, consistent with one or more embodiments of the present invention.

Referring now to FIG. 7, an embodiment 700 of a reel assembly is illustrated. In one or more embodiments, the one or more display devices defining a reel may remain stationary, while other components of a reel assembly rotate. FIG. 7 illustrates one such embodiment. In embodiment 700, one or more display devices 705 are shaped like a reel (e.g., curved in a cylindrical shape or to resemble a portion of a cylinder). The one or more display devices 705 remain stationary. On each side of the one or more display devices 705 is a rim (rim 710 and rim 715). A rim may be a disc or ring whose radius is substantially equal to the radius of the cylindrical shape formed by the one or more display devices. Accordingly, the rim 710 and the rim 715 frame the one or more display devices 705. The rims 710 and 715 may each be located adjacent to the one or more display devices 705, with the center of the ring or disc comprising each respective rim 710 and 715 being aligned with (i.e., being located along the same axis as) the center of the cylindrical shape that the one or more display devices 705 form. The rims 710 and 715 may be located very close to the one or more display devices 705, such that it appears to a viewer of the reel assembly 700 that the rims 710 and 715 and the one or more display devices 705 rest on, or are part of, the same surface. In other words, it should appear as if the rims 710 and 715 are an extra width of a supporting surface of the one or more display devices 705, showing on either side of the display devices. However, each of the rims should remain free to move about an axis, without significant impedance from the adjacent one or more display devices.

The rings or discs forming the rims 710 and 715 are centered about an axis that is perpendicular to a player's line of sight. In one or more embodiments, the two rims 710 and 715 are operable to rotate in the same direction and at the same speed. The rotation of the two rims thus creates the illusion that both the two rims 710 and 715, and the one or more display devices 705 located between them, are moving in tandem. However, the one or more display devices 705 in fact remain stationary. In one or more embodiments, the indicia displayed along the reel formed by the one or more display devices 705 may be displayed as moving in the same direction and with the same speed as the rims 710 and 715, thus making it appear even more that the one or more display devices 705 are also moving. Note that the means for moving the reel, described above, may be utilized to move the two rims 710 and 715.

Note that the two rims may or may not be connected to one another or to a common component. For example, in one embodiment each rim may respectively be connected to the same circular surface that rotates about a shaft. In another example, the rims may be connected to one another via connections underneath the one or more displays located between the reels. Note that the connections may or may not be in contact with the one or more displays. Further note that the reel of embodiment 700 is illustrated as having a plurality of display devices (e.g., LEDs) located along its outer first surface.

Figure 8:
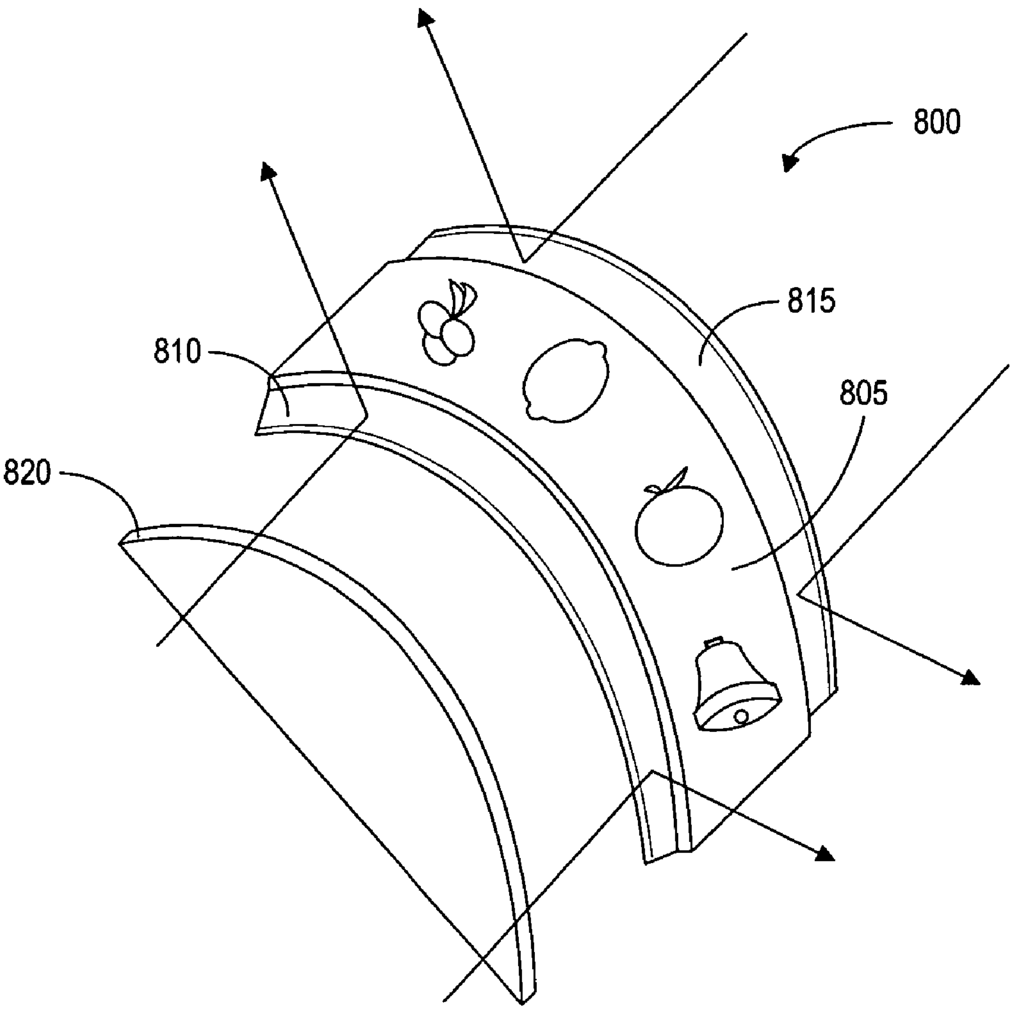
FIG. 8 is a plan view of a display device assembly that includes a mirrored surface, consistent with one or more embodiments of the present invention.

Referring now to FIG. 8, an embodiment 800 of a reel assembly is illustrated. Embodiment 800 is another embodiment in which the one or more display devices in the shape of a reel remain stationary while other components of the reel assembly move. In embodiment 800, one or more display devices 805 are mounted along the outer periphery of a reel. Alternately, the one or more display devices may be positioned and shaped to resemble at least a portion of a reel without being mounted on or attached to a separate supporting surface. The one or more display devices 805 have on either side a rim, rims 810 and 815. The rims and the one or more display devices may be positioned in a configuration substantially similar to that described with respect to FIG. 7. However, in embodiment 800 (unlike in embodiment 700 of FIG. 7) each of the rims remains stationary, as does the one or more display devices 805. Further, each of the rims 810 and 815 comprises a mirrored surface. At one side, one of its longer sides, each mirrored rim may be attached to one edge of the reel formed by the one or more display devices. Note that, unlike embodiment 700, the rims may be attached to the one or more display devices or to a surface supporting the one or more display devices since the rims in embodiment 800 do not move. Alternately, each mirrored rim may be located along a side of the cylindrical surface formed by the display devices, without being attached. However, each mirrored rim 810 and 815 should be placed along the one or more display devices close enough so that it appears that the rims and the one or more display devices are both supported by the same surface, part of the same surface, attached to one another, or otherwise part of a reel. Note that each of the mirrored rims follows the curve of the reel formed by the one or more display devices 805. Further, each of the mirrored rims 810 and 815, from where it is attached or appears to be attached to the reel, angles downwards relative to a plane tangent to the surface of the reel. Therefore, if a hypothetical insect were walking across the outer surface of the reel and walked onto one of the mirrored rims, the insect would begin walking at a downwards slope relative to the less sloping (in a horizontal direction) reel where it had been walking. In one embodiment, the angle formed between Is the reflecting surface of a mirrored rim and the outer first surface of the reel is approximately 225 degrees at the point where the edge of the mirrored rim meets the edge of the reel.

Each of the mirrored rims 810 and 815 reflects light that is incident from a direction that is perpendicular to the main plane of the reel (the plane in which the reel would rotate if it actually moved), to a direction that is perpendicular to a plane tangent to the surface of the reel. The four bent arrows in FIG. 8 illustrate how incident light is reflected off each of the mirrored rims 810 and 815.

Reel assembly 800 also comprises a surface 820, which may spin in a plane parallel to the plane in which the reel would rotate if it moved. The surface 820 may be of a circular shape, for example a disk. Furthermore, the axis of rotation of the surface 820 may be the same as that of the reel, were the reel to actually rotate.

As is apparent from the FIG. 8, light from the disk may be reflected off of the mirrored rim 810. An analogous circular surface may be located on the opposite side of the reel, and be reflected in the mirrored rim 815. The surface 820 is rotated about its axis and the moving surface is reflected in the mirrored rim 810. The analogous surface on the opposite side of the reel is rotated about the same axis and is reflected in the mirrored surface 815.

The surface 820 and the analogous circular surface on the opposite side of the reel are rotated at the same speed and the rotation of each is started at same time. Since each of these circular surfaces is reflected in a mirrored rim on either side of the reel, the result is an appearance of a rotation of the reel itself. In one or more embodiments, markings or imperfections may be included on the surface 820 and the analogous circular surface on the opposite side of the reel, thus making it even more convincing that the reel itself is rotating. A player watching the reel of embodiment 800 would see the reflection of the rotating circular surfaces in the mirrored rims 810 and 815, respectively. The player may thus perceive the illusion that the reel itself is rotating.

Note that the surface 820 and the analogous circular surface on the opposite side of the reel may be located out of view of a player, such that a player viewing the reel would be unaware of either of the circular surfaces. Further note that the reel assembly of embodiment 800 may include a means for moving the circular surface 820 and the analogous surface. For example, one or more stepper motors or other electromechanical motors may be operable to rotate the circular surface 820 and the analogous surface, respectively. Further note that the reel of embodiment 800 is illustrated as having a single long flexible display device located along its outer first surface.

Note that many other images may be reflected in a mirrored rim. For example, a slot machine may contain a display screen facing the main plane of the reel. The display screen may display a spinning disk. The image of the spinning disk, as displayed, may then be reflected off a mirrored rim, into the player's line of sight.

Referring now to FIG. 7 and FIG. 8, it should be noted that the one or more display devices and any supporting surface on which the display devices rest or are attached to may not form a complete cylindrical shape. Since the display devices in embodiments 700 and 800 do not necessarily move, the display devices and any supporting surface may form a portion of a cylinder (i.e., the portion of the cylindrical shape of a reel that a player typically views when the reel is stationary).

Databases

The following is a detailed description of exemplary tabular representations of various databases that may be utilized in the present invention. Note that, although the example embodiments depicted in FIG. 9 and FIG. 10, respectively, include particular databases, other database arrangements may be used which would still be in keeping with the spirit and scope of the present invention. In other words, the present invention could be implemented using any number of different database files or data structures, as opposed to the particular ones indicated in FIG. 9 and FIG. 10. Further, the individual database files could be stored on different servers (e.g. located on different storage devices in different geographic locations, such as on a third-party server). Likewise, the program 220 could also be located remotely from the data storage device 215 and the reel processor 355 can be located remotely from the display devices 340.

As indicated above, the program 220 may include instructions for retrieving, manipulating, and storing data in the databases 225 and 230, as may be useful in performing the methods of the invention as will be further described below.

Example embodiments of the databases described as being stored in slot machine 200 (e.g., in data storage device 215 and/or a display memory 340) and/or another device (e.g., a controller controlling a plurality of slot machines or a casino server) are described in detail below. Example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though two separate databases are illustrated, the invention could be practiced effectively using one, three, four, five, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

Referring now to FIG. 9, illustrated therein is a tabular representation 900 of the indicia database. The tabular representation 900 of the indicia database includes a number of example records or entries R950-R965, each defining an indicium. Those skilled in the art will understand that the indicia database may include any number of entries. The tabular representation 900 also defines fields for each of the entries or records. The fields specify: (i) an indicium identifier 910 that uniquely identifies an indicium available for display on a display device; (ii) an indicium description 920; (iii) a game 930 that indicates the game in which the corresponding indicium may be used; and (iv) an indicium graphic 940. Note that other fields may be included in table 900. For example, a probability of each indicium's occurrence may be stored.

The indicia database 900 may be stored in a memory of a slot machine. For example, the indicia database may be stored in data storage device 215 (FIG. 2) or in a display memory 340 (FIG. 3). In one or more embodiments, a display memory 340 is associated with a particular display device or a particular angular surface location of a display device, as described above. In such an embodiment, the indicia database 900 stored in the display memory may store information about each indicium that may be displayed on the particular display device 340 or the particular angular surface location. Alternately, the indicia database may be stored in a device other than a slot machine, such as a server that controls a pod of slot machines or a casino server.

The indicia database 900 may be utilized to determine which indicium to display on a display device or at a particular angular surface location of a display device. For example, a processor programmed to select an indicium based on one or more rules may access the indicia database 900 to select an indicium. In one or more embodiments, the data defining an indicium may be uploaded to another memory. For example, data defining a particular indicium as stored in the indicia database 900 may be uploaded to a display memory 340 when it is determined that this particular indicium should be added to the indicia already stored in the display memory or replace one of the indicia already stored in the display memory.

For example, as illustrated in record R950 of the indicia database 900, an indicium has an indicium identifier "S0001". A display memory 340 may, on a periodic or non-periodic (e.g., when one or more predetermined conditions have been satisfied), receive instructions from a processor (e.g., processor 205 and/or reel processor 355) about which at least one indicium to have displayed on a particular display device 335 or at a particular angular surface location of a display device 335. For example, the processor 205 or the reel processor 355 may transmit a signal indicating that the indicium identified by indicum identifier "S0001" is to be displayed on a particular display device. The display memory may thereby cause indicium "S0001" to be displayed by, for example, accessing memory locations corresponding to indicium "S0001", and transmitting pixel data from the memory locations to the corresponding display device. For example, the processor 205 or the reel processor 355 may access the indicia database 900 to retrieve data defining the indicium (e.g., to retrieve the indicium graphic 940 to be displayed).

On a periodic or non-periodic basis, a display memory 340 may receive data about new indicia from the processor 205 and/or the reel processor 355. For example, the processor 205 and/or the reel processor 355 may retrieve data defining an indicium from a record of indicia database 900 and transmit this data to the display memory 340. The new indicia data may define indicia for a new game or updated indica for a game. The display memory 340 may store the data defining the new indicia. In some embodiments, the display memory 340 must overwrite data defining a currently stored indicium. In such embodiments, the display memory 340 may receive instructions from the processor 205 and/or the reel processor 355 defining which indicium to overwrite, and/or as to the locations in memory where the data defining the new indicia is to be stored.

The indicia database 900 may store data defining indicia available for display on a single slot machine or data defining indicia available for display on a plurality of slot machines.

Not all of the fields depicted in FIG. 9 are required, and various substitutions, deletions and other changes to the tabular representation will be readily apparent to those of ordinary skill in the art.

Referring now to FIG. 10, illustrated therein is a tabular representation 1000 of the surface locations database. The tabular representation 1000 of the surface locations database includes a number of example records or entries R1070-R1080, each identifying a plurality of indicia available for display at a particular angular surface location of a reel. Those skilled in the art will understand that the surface locations database may include any number of entries. The tabular representation 1000 also defines fields for each of the entries or records. The fields specify: (i) a surface location identifier 1010 that uniquely identifies an angular surface location of a reel; (ii) a first indicium identifier 1020 that uniquely identifies a first indicium available for display at the corresponding surface location; (iii) a second indicium identifier 1030 that uniquely identifies a second indicium available for display at the corresponding surface location; (iv) a third indicium identifier 1040 that uniquely identifies a third indicium available for display at the corresponding surface location; (v) a fourth indicium identifier 1050 that uniquely identifies a fourth indicium available for display at the corresponding surface location; and (vi) a current indicium identifier 1060 that uniquely identifies an indicium that is currently being displayed at the corresponding surface location.

Although a maximum of four indicia is illustrated as corresponding to a surface location, any number of indicia may be used. Further, although the current indicium identifier field 1060 illustrates only one indicium as being displayed at a particular surface location, in some embodiments more than one indicium may be displayed simultaneously at a surface location.

The surface locations database may store data for a particular reel. For example, in one or more embodiments, the one or more indicia available for display at one or more surface locations of a particular reel may be stored in the surface locations database. The surface locations database may be stored, for example, in a display memory corresponding to a particular display device forming the shape of a reel and having a plurality of surface locations or a set of display devices forming the shape of a reel, the set having a plurality of surface locations. In one or more embodiments, the table 1000 may represent a record of a surface locations database, each record being associated with a particular reel of a particular slot machine. Thus, the surface locations database may store records for a plurality of reels, each record including an identifier that uniquely identifies the reel. In yet other embodiments, the table 1000 may be associated with a plurality of reels, each reel having a plurality of surface locations with the surface location identifiers illustrated. In such embodiments, the table 1000 may include a plurality of current indicium fields 1060, one field for each reel associated with the table.

Processes

Figure 11:
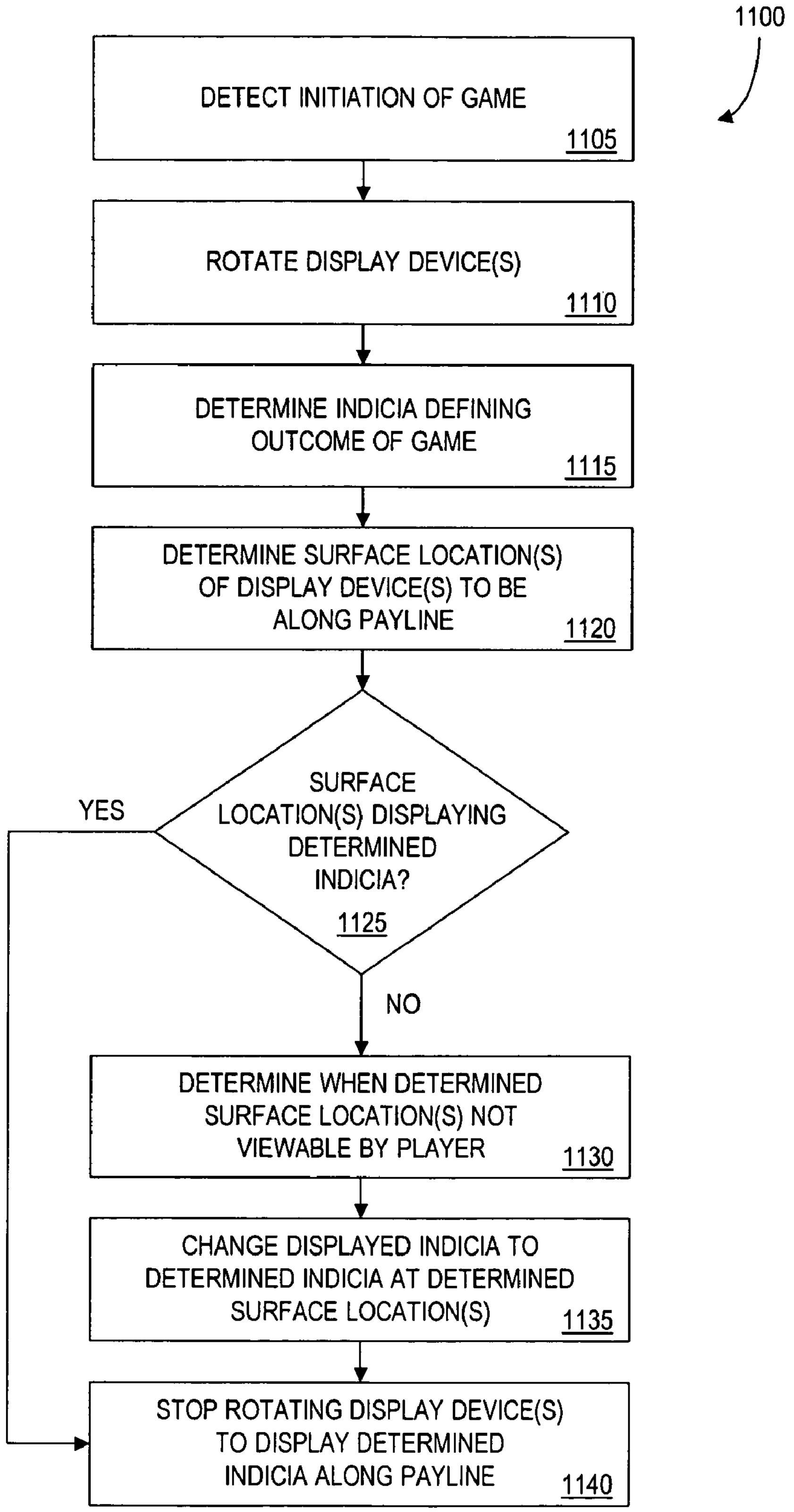
FIG. 11 is a flow chart illustrating an exemplary process according to an embodiment of the present invention.

Referring now to FIG. 11, a process 1100 illustrates one method consistent with one or more embodiments of the present invention. The process 1100 may be carried out by a processor of a slot machine 200, operating in accordance with instructions from processor 205 or instructions from another source (e.g., another device, such as a casino server or controller of the slot machine). Alternatively, any and all of the steps of process 1100 may be carried out by a processor of another device (e.g., a casino server or controller of the slot machine). Further, the order of the steps illustrated in process 1100 is exemplary only. Additional steps before, after, or in between any of the steps illustrated may also be carried out without departing from the scope of the present invention.

In step 1105, it is determined that a game has been initiated at a slot machine. For example, it may be detected that a wager for a game has been inserted into the slot machine and/or that a start mechanism of the slot machine (e.g., a start button or handle) has been activated.

In step 1110, the one or more display devices of the slot machine are rotated. Note that the one or more display devices may already have been rotating before step 1110 (e.g., the slot machine may have been in an "attract" mode). For example, processor 205 of the slot machine may direct a stepper motor of a reel to move the reel about a shaft, thus moving the one or more display devices of the reel about the shaft.

In step 1115, indicia defining an outcome for a game are determined. For example, a random number may be obtained from a random number generator and the outcome corresponding to the obtained random number may be looked up in a probability database, as would be understood by a person of ordinary skill in the art.

In step 1120, the one or more surface locations at which the indicia defining the outcome are to be displayed are determined. As described, the one or more display devices 335 may comprise a single long flexible display that is "wrapped" around the outer first surface of a reel and is comprised of a plurality of surface locations along its length. In one embodiment, a particular surface location of each reel may be designated as the surface location at which the indicium of an outcome for a game are to be displayed. In such embodiments, the slot machine may be programmed such that the reels always come to a stop with the designated surface locations being displayed along a payline of the slot machine. In other embodiments, the surface locations for displaying the outcome may be determined in a random fashion or may be based on one or more predetermined rules. Note that, in embodiments where each surface location comprises a distinct display device, the step of determining the one or more surface locations at which the outcome is to be displayed may comprise determining the one or more display devices on which the outcome is to be displayed.

In step 1125, it is determined whether the surface locations determined in step 1120 are currently displaying the indicia determined in step 1115. If they are, then the process 1100 continues to step 1140. Otherwise, the process 1100 continues to step 1130.

As described, in one or more embodiments it may be desirable to change the indicium displayed at a particular surface location or on a particular display device when the particular surface location or particular display device is not in view of the player (e.g., then the surface location or display device is facing the interior of the slot machine, at a particular angle of rotation of the reel). This may be done to avoid drawing to the attention of the player the fact that the displayed indicia is easily changeable. Accordingly, in step 1130 it is determined when the one or more surface locations determined in step 1120 are not in view of the player of the slot machine. For example, a predetermined angle of rotation may be stored for each surface location or for each display device in memory, the stored angle of rotation indicating the angle of rotation of the reel that, when achieved, results in the surface location or display device being not viewable by the player.

Once the surface locations are determined to be out of view of the player, the indicium displayed at the surface locations are changed from the currently displayed indicia to the indicia determined in step 1135 (step 1130). Note that the indicium displayed at the surface location of each respective reel may be changed at different times. For example, assuming a slot machine comprises three reels, the determined surface location of the first reel may be out of view of the player at a first time, the determined surface location of the second reel may be out of view of the player at a second time, and the determined surface location of the third reel may be out of view of the player at a third time. Accordingly, the indicium displayed at each surface location may be displayed at different times.

In step 1140, the rotation of the display devices is stopped such that the surface locations determined in step 1120 are displayed along a payline of the slot machine. For example, a processor of the slot machine may direct the index arm 385 to fit into a groove 380 of the index wheel 375 such that the display devices are stopped at the appropriate angular position.

Note that the reels of a slot machine do not have to stop simultaneously. For example, assuming again that the slot machine has three reels, the one or more display devices of the first reel may be stopped at a first time, the one or more display devices of the second reel may be stopped at a second time, and the one or more display devices of the third reel may be stopped at a third time.

Note that an additional step of determining which indicia to display at surface locations other than the surface locations determined in step 1120 may be included in process 1100, as is consistent with one or more embodiments of the present invention. For example, a memory of the slot machine (e.g., data storage device 215 and/or a display memory 340) may store a plurality of indicia as available for display on one or more display devices. The memory may further store one or more rules for determining which of the indicia to display on which display device or at which surface location of a display device. For example, the surface locations that are not going to be used to display an outcome of a game may instead be used to display marketing messages or entertaining images to the player.

Examples of rules that may govern which indicia to display on a display device or at a surface location of a display device include, but are not limited to:

(i) display an offer V at any surface location that is not to be used to display an outcome for a game, if any of conditions (a), (b), or (c) are satisfied;

(ii) display an offer W at surface location "S-0008" if condition (d) is satisfied and if offer W has not been previously been rejected by player;

(iii) display an advertisement X at surface location "S-0001" for the first two rotations of the reel during a game, then display an advertisement Y;

(iv) display an image Z at surface location "S-0002" until instruction to change is received.

Note that one or more of the above stored rules may apply to (i) all reels of a slot machine, (ii) all reels of all slot machines controlled by a controller (e.g., where the one or more rules is stored in a memory of the controller); (iii) all display devices or surface locations of a particular reel; or (iv) a particular surface location or display device (e.g., wherein the one or more rules are stored in a display memory of a display device).

The process 1100 may further include a step, consistent with one or more embodiments of the present invention, of determining when to change a displayed indicium. For example, the memory may further store one or more rules for when an indicium is to be changed, if it is determined that a displayed indicium needs to be changed to another indicium. Examples of such rules include, but are not limited to:

(i) change indicia only when the subject surface location or display device is out of view of player;

(ii) change indicia displayed on surface location X or display device Y when reel of surface location X or display device Y is at angle of rotation of "210 degrees";

(iii) change indicia displayed at the subject surface location or on subject display device during last rotation before reel comes to a stop, while the surface location or display device is out of view of the player;

(iv) change indicia when to do so is signal received;

(v) change indicia at surface location X every fifteen seconds, irrespective of whether the surface location is out of view of the player;

(vi) change indicia at surface location Y for every rotation, while the surface location is out of view of the player.

Note that a combination of rules may be used. For example, rule (i) and (iv) may be used in conjunction. Further note that one or more of the above stored rules may apply to (i) all reels of a slot machine; (ii) all reels of all slot machines controlled by a controller (e.g., where the one or more rules is stored in a memory of the controller); (iii) all display devices or surface locations of a particular reel; or (iv) a particular surface location or display device (e.g., wherein the one or more rules are stored in a display memory of a display device).

A processor of a slot machine (e.g., processor 205 and/or reel processor 355) may be operable to use one or more of the rules described above (i.e., a rule for determining which indicium to display and a rule for when to change the displayed indicium) to carry out the methods of the present invention. A processor of a device other than a slot machine (e.g., a processor of a casino server or a controller controlling the slot machine) may also be operable to use one or more of the rules. A program storing instructions for the processor may include one or more subroutines governing the use of the one or more rules.

In various embodiments of the present invention, advantages over traditional mechanical reel slot machines are provided in that the indicia on the reels can be changed dynamically. For example, a given angular surface location on a reel that is currently displaying a cherry symbol may be changed to display a bar symbol. Additionally, rather than showing a static indicium, a reel in accordance with embodiments of the present invention may display an animated indicium (e.g., with eyes blinking or with mouth moving). A reel in accordance with embodiments of the present invention may also dynamically display text. A reel in accordance with embodiments of the present invention may also change the background against which an indicium is displayed, or even display multiple indicia at the same angular surface location. A reel in accordance with embodiments of the present invention may display indicia that are selected by a player. For example, the player may browse the Internet using a browser rendered by the slot machine. The player may find an image displayed on a Web page, and select the image to be displayed as an indicium or as background on one of the display devices. The player may also provide a picture, e.g. of a grandchild or of a pet. The player may scan the picture into the slot machine using an attached scanner, or may give the picture to a casino employee. The casino employee may then scan the picture using a scanner, and may upload the digitized image to the slot machine (e.g., via a casino network). The digitized image may then appear on a display device of the slot machine. Various embodiments provide numerous other possibilities for changing or updating indicia displayed on a display device 335.

In one or more embodiments, the ability to change a displayed indicium allows a reel to contain a relatively few number of predefined angular surface locations, while still having the ability to display a relatively large number of indicia. For example, assume it is desirable for a reel to display fifty different indicia. A traditional mechanical reel slot machine would require the reel to have at least fifty predefined surface locations or stops, one for each indicium. Such a reel would likely be large and difficult to manage. In contrast, one embodiment of the present invention might employ a reel with only eight predefined angular surface locations or stops. However, this reel may still be operable to display the fifty different indicia, even within one round of a game. For example, as a display device goes out of view of the player (e.g., by being rotated to a predetermined angle), the indicium currently displayed on the display device can be changed to a different indicium. Therefore, the reel is not limited to displaying only eight indicia, but may display a theoretically limitless number of different indicia.

Of course, reels of the present invention may have more or less than eight stops, and a memory of the slot machine may store a number of indicia that is greater than the number of stops, the same number of indicia as the number of stops, or a smaller number of indicia than the number of stops (assuming that each indicium of the number of indicia is unique).

For example, in one or more embodiments, a display memory 340 may store a plurality of indicia as available for display at a particular angular surface location of a reel or on a particular display device 335 of a reel. The reel processor 355 (or another processor, such as processor 205) may receive reel position signals from, for example, photo sensors on the reel passing in front of a fixed laser. Based on the reel position signals, the reel processor 355 determines a particular display device is in the 12:00 position. The reel processor 355 may thereby instruct the display device 335 to display a particular indicium of the plurality of indicia stored in memory.

Note that many existing slot machines use a physical reel that is controlled in accordance with a virtual reel stored in the memory of the slot machines. The physical reel is made to stop so as to display an indicium already selected from the virtual reel using a random number generator. Therefore, with existing slot machines, the physical reel must have at least as many stops as the virtual reel has unique indicia. In contrast, reels of the present invention can have many fewer stops than the number of unique indicia stored in memory as available for display on the one or more display devices of the reel.

Various embodiments of the present invention improve upon existing slot machines by allowing a reel to stop its spinning motion on its own. In other words, in one or more embodiments a reel in accordance with embodiments of the present invention does not have to artificially be stopped such that a particular surface location is displayed along a payline of the slot machine. Rather, a reel may be allowed to stop by virtue of frictional forces (e.g., without a motor actively speeding or slowing its motion, and without a brake actively slowing its motion). Even though a reel is allowed to stop virtually on its own, a processor of the slot machine (e.g., processor 205 and/or reel processor 355) may still cause the reel to display a desired indicium (e.g., an indicium selected using a random number generator) along the payline of the slot machine when the reel stops rotating. The processor of the slot machine may accomplish this by determining (e.g., using laws of physics) the surface location that will be displayed along the payline of the slot machine when the reel stops its rotation, and by instructing the display device of the surface location to display the selected indicium. The processor may determine the angular surface location that will be displayed along the payline when the reel stops rotating in various ways. For example, the processor may receive periodic indications of the current angular position of a surface location as the reel is rotating. The processor may determine the speed of the reel by measuring the time difference between when a particular surface location of the reel reaches a first angular position and when the particular surface location of the reel reaches a second angular position. Knowing the physical characteristics of the reel, such as the moment of inertia about the axis of rotation, the frictional forces acting upon the reel, the air resistance to the rotating reel, etc., the processor may calculate using well known physical equations the surface location which will be displayed along a payline of the slot machine when the reel stops rotating.

In some embodiments, when the reel gets close to stopping its rotation, the processor may instruct the index arm or the reel controller to bring the reel to a stop so that an indicium is centered along the payline. Otherwise, the reel might stop in such a way that an indicium is not centered along a payline of the slot machine, which may or may not be desirable.

In one embodiment, the present invention allows for a unique interaction between the motion of a reel and the animated motion of indicia displayed on the reel. An indicium representing a cartoon character may, for example, appear to be running counter to the motion of the reel. Thus, if the portion of a reel in view of a player is moving upwards, then the cartoon character displayed on the one or more display devices of the reel may appear to be "running" downwards. The situation is analogous to a person trying to run down an up-escalator. Thus, even as a reel rotates, the indicium displayed may appear to remain in view of the player. However, eventually the character may "tire" from the effort, and be swept upward with the rotation of the reel. An indicium or cartoon character may also "jump" from a first reel to a second reel. The second reel might be moving at a different speed than the first reel, in which case the character might be carried away at a different speed than that at which he entered the player's field of view.

In one or more embodiments, a display device may maintain a static image when viewed by the player. However, each display device may display an image which is the succeeding frame in an animation or video sequence to the last image seen by the player. For example, a first display device to be displayed at a particular viewing perspective (e.g., crossing the payline of the slot machine) shows a bird with its wings pointed downwards. A second display device to be displayed at the same viewing perspective may show the same bird but with its wings pointed horizontally. A third display device to be displayed at the particular viewing perspective may show the same bird with its wings pointing upwards. Therefore, even though each display device has displayed only a static image, the physical spinning of the reel allows the player to view the static images in rapid succession, making for the appearance of a single animated image of a bird flapping its wings. Furthermore, when each display device is not in view of the player, the display device may change its image to allow for the continuity of the animation sequence beyond a complete rotation of the reel. Note that, in this embodiment, the image displayed on a particular display device may be revealed once the display device is positioned at the particular viewing perspective (e.g., once the display device is crossing or about to cross the payline of the slot machine). This would enhance the player's perception of the image as moving at the particular viewing perspective without being distracted by the motion of the reel. Alternatively, to focus the player's attention on the image being displayed at the particular viewing perspective (e.g., the image being displayed along the payline), the image may be displayed before it reaches the viewing perspective but may be enhanced once it reaches the viewing perspective. For example, the brightness of the image may be enhanced or the background of the display on which the image is displayed may be dimmed at substantially the time that the image is displayed at the particular viewing perspective.

Various embodiments of the present invention provide many of the advantages of video slot machines. For example, when the physical reels of the present invention are not in motion, the one or more display devices in view of the player or the portion of the single display device in view of the player may be operable to: (i) display pay tables; (ii) display one or more credit balances; (iii) display instructional screens or messages; (iv) display data associated with a bonus round (e.g., the bonus round may consist of a video or animated sequence); (v) display a demonstration (e.g., of winning outcomes); and/or (vi) display marketing offers.

Marketing offers may, in particular, result in a major new source of revenue for a casino. For example, a casino might sell products to a player using marketing offers, or a casino may receive money from third party merchants who are allowed to market to players using the casino's slot machines. Another possibility is that third party merchants transfer money directly to the player in return for player commitments. The player is then likely to use money he has received from the marketer to continue gambling. It is anticipated that many players who use slot machines of the present invention are players who had previously been attracted to mechanical reel slot machines. Thus, players using slot machines of the present invention provide a new revenue opportunity since they otherwise might not have exposure to slot machines with display screens for presenting marketing offers.

The one or more display devices of one or more reels may further be operable to display movies, live broadcasts, or television shows. Moreover, the one or more display devices of one or more reels may further be operable to show pictures of other players who form a team with the player. Commonly-owned, co-pending U.S. patent application Ser. No. 10/414,934, filed Apr. 15, 2002 and entitled METHOD AND APPARATUS FOR LINKED PLAY GAMING WITH COMBINED OUTCOMES AND SHARED INDICIA, describes various systems and methods in which players of slot machine can form teams. The entirety of this application is incorporated by reference herein for all purposes.

In one or more embodiments, a processor of the slot machine (e.g., processor 205 or reel processor 355) may, for example, measure (e.g., while the reels of the slot machine are in motion) the rate at which the one or more display devices or surface locations of the one or more display devices are disappearing from the player's view. The processor may then direct the display devices or surface locations appearing in view to assume the images displayed on the disappearing display devices. The image transfer may occur at the same rate at which display devices are disappearing from view. In some instances, a display device, which is in motion, must constantly update its own image so as to make the image appear stationary from the player's point of view. If, for example, the display device is moving downwards at a rate of 100 pixel-lengths per second, then the image must be shifted upwards relative to the display device at 100 pixel-lengths per second. If the image is refreshed 100 times per second, then the image must shift upwards by one pixel every time the image is refreshed.

In one or more embodiments, indicia of the present invention may change their appearance. For example, when an indicium representing a diamond appears in a player's view, the diamond may appear to shimmer as though in front of a bright light. In another example, when an indicium representing a face appears in the player's view, the face may appear to "wink" at the player.

In one or more embodiments, the one or more display devices of a single reel or display devices of multiple reels may be operable to form one continuous viewing area. For example, the display devices may be positioned so closely together as to appear to display one continuous viewing area and be operable to display a first portion of a particular image on one of the display devices comprising the continuous viewing area while displaying a second portion of the particular image on another one of the display devices comprising the continuous viewing area.

Moreover, embodiments of the present invention allow indicia to interact with one another. For example, if a first indicium representing a cat is displayed on a first display device or a first surface location of a display device and a second indicium representing a mouse is displayed on a second display device or second surface location of a display device, then the cat and mouse may become animated, and the cat may "chase" the mouse.

In one or more embodiments, when the one or more display devices forms one continuous viewing area, the slot machine may cause each reel of the slot machine to rotate to a predetermined angular position in order to form the continuous viewing area. In this way, for example, in displaying an image over more than one display device, a processor of the slot machine (e.g., processor 205 and/or reel processor 355) can communicate with the same display memories associated with predetermined display devices or predetermined surface location of a display device, and the same display memories can store predetermined portions of the larger image. Furthermore, when the reels rotate to a predetermined angular position for forming the continuous viewing area, the reels may go blank. In other words, the display devices forming the continuous viewing area may clear any symbols from their displays. In this way, there is no chance that the rotation of the reels could reveal a winning outcome where the player might claim that he should be paid. The symbols from the reels may likewise go blank in any other situation when the reels are rotated and the rotation is not part of generating an outcome. For example, the reels may go blank when the reels are rotated into position for high bandwidth communication between a processor and the reels.

In one or more embodiments, the one or more display devices 335 are exposed to a player's touch, and may serve as touch screens. The player may then interact with the display devices in any way he might interact with a touch screen. For example, a display device might display a button. The player may "press" the button by touching the surface of the display device.

In other embodiments, a transparent touch-sensitive panel separates the player from the reels, and therefore from the display devices. In such embodiments, the display devices together with the panel may act as a touch screen. A player may first touch an area of the touch-sensitive screen. A processor of the slot machine may then determine the area of the screen that the player has touched. The processor may also determine which display device is currently behind the area of the screen that the player has touched. The processor may then instruct the display memory corresponding to the display device to respond by, e.g., displaying a depressed button. The processor may also respond by, e.g., instructing the coin hopper of the slot machine to provide coins to the player if the player has just indicated his desire to cash out.

In various embodiments of the present invention, the slot machine may reveal an outcome in two or more stages. For example, in a first stage of revelation, the slot machine shows an outcome of "bell-bell-plum" where the third reel shows that a bell symbol is at the stop right above the plum symbol. Therefore, it appears to the player that he has just missed achieving the outcome of "bell-bell-bell". However, in the second stage of revelation, a friendly animated character, such as an angel, appears. The character may be displayed on one or more of the display devices. The character may then appear to push down on the third reel, so that it turns by one stop, leaving the player with the final outcome of "bell-bell-bell". In this case, even though the angel is an animated character, the third reel of the slot machine may actually physically turn. Commonly-owned, co-pending U.S. patent application Ser. No. 10/328,116, filed Dec. 20, 2002 and entitled METHOD AND APPARATUS FOR OUTPUTTING OUTCOMES OF A SLOT MACHINE described various methods in which outcomes may be revealed to a player. The entirety of this application is incorporated by reference herein for all purposes.

In one or more embodiments at least one projection device is mounted at a fixed location within the inner cavity formed by the substantially concave inner second surface of the cylindrical surface 305 (assuming the shape of the reel is the cylindrical surface 205 and includes the inner cavity). The projection device may not be attached to the cylindrical surface 205 or to any components attached to the cylindrical surface 305. Moreover, the projection device need not be within the plane of the reel. Accordingly, the projection device can remain fixed while the cylindrical surface 205 rotates. The projection device may project at least one indicium onto the inner second surface of the cylindrical surface 305. The cylindrical surface 305 may be transparent or translucent, so that the projected image is visible to a viewer of the substantially convex first surface of the cylindrical surface 305. In this manner, the projection device may cause the at least one indicium to appear on the outer second surface. The projection device may therefore be used in lieu of the one or more display devices 335. Note that the projection device may even be mounted outside of the inner cavity, but may be operable to project one or more indicia onto the inner second surface of the cylindrical surface 305.

Alternately, the projection device may be mounted outside the inner cavity of the cylindrical surface 305 (e.g., in some embodiment the cylindrical surface 305 does not comprise an inner cavity since it forms a solid cylinder) and be operable to project indicia onto the outer first surface of the cylindrical surface 305.

In one or more embodiments, a slot machine may comprise a projector that projects indicia onto a mirror, which then reflects the indicia from the projector onto the inner second surface or outer first surface of a reel. In this way, a projector can project in a direction substantially parallel to the axis of rotation of the reels, and can project onto any one of several mirrors, each located near the center of rotation of one of the reels. The same projector can thereby project indicia onto multiple reels.

In one or more embodiments, the reel may comprise holograms instead of the one or more display devices 335. A hologram may store a number of images. A particular hologram may be revealed, for example, by shining a laser upon the hologram from a particular angle of incidence. Thus, the slot machine may maintain a number of fixed lasers directed towards the outer first surface of the cylindrical surface 305, at the point where a particular surface location of the outer first surface is in view of a player. A processor of the slot machine may control the image to be displayed by directing the proper laser to shine upon the image.

In one or more embodiments, a reel may comprise a surface depicting indicia that are not updateable based on a signal of a processor, in addition to one or more display devices 335. For example, a first portion of the outer first surface of cylindrical surface 305 may comprise a surface with one or more static indicia depicted therein (e.g., a plastic, metal, or fiberglass surface with indicia painted thereon) while a second portion of the outer first surface may comprise one or more display devices 335 that are operable to update indicia based on a signal of a processor. In some embodiments, a surface with no indicia depicted thereon is interspersed with the one or more display devices 335.

In one or more embodiments, moving image data may be transmitted to the reels from a stationary centralized memory with a high storage capacity. The moving image data may be transmitted to the reels when the reels are stationary via a high bandwidth connection. For example, the reels may be stationary when displaying a video clip showing a bonus round.

In one or more embodiments, it may be desirable to rotate a reel at a rate that is different from the refresh rate of the one or more display devices of the reel. For example, if the rotation of the reel is the same as the refresh rate of the one or more display devices the result may be an undesirable viewing effect. For example, suppose a display device refreshes at fifteen times per second. Suppose also that the reel of the display device rotates at fifteen revolutions per second. If the display device is between refreshes when first in view of the player, then the display device may appear blank to the player on every revolution of the reel. This is undesirable, in many embodiments, as the display device is meant to show an indicium to the player. Therefore, the reels may be rotated at a speed that differs substantially from the refresh rates of the one or more display devices. Alternatively, the reels may be rotated at the same rate as the refresh rate of the display devices, but the appearance of a display device in view of the player may be timed to coincide with the presence of an indicium on the display device.

Embodiments of the present invention have been described wherein the reel is a cylindrical shape, with display devices attached to the outer first surface of the cylindrical shape. However, in other embodiments, display devices may be attached to an elongated surface which runs along a portion of the outer first surface of the reel and conforms to the shape of the cylindrical shape of a reel along that portion but then continues beyond the cylindrical shape of the reel. The elongated surface is analogous to the cable of a ski lift. At the point where a ski carriage changes direction, the cable to which the ski carriage is attached conforms to a circular, rotating wheel. However, once a carriage has reversed direction, the cable to which it is attached no longer conforms to the wheel, and may, in fact, dangle in mid air. In this embodiment, the elongated surface to which the one or more display devices are attached may be significantly longer than the circumference of the reel. In some embodiments, the one or more display devices may comprise the elongated surface. In such embodiments, the means for moving the one or more display devices moves the display devices in a curvilinear path. In some embodiments, the elongated surface may conform to the reel over the reel's entire length, but may be a separate surface from the cylindrical surface of the reel none-the-less.

In one or more embodiments, the one or more display devices comprising the shape of a reel may be operable to display a continuous line, shape, or other image along the expanse of the outer first surface of the reel. For example, a reel may display a line of continuously varying thickness that runs in the direction of rotation of the reel. Therefore, as the reel rotates, the player sees a different portion of the line at different angular positions of the reel. Furthermore, display devices out of the player's view, or portions of a single display device which are out of the player's view, may update their displayed images, so that the portion of the line shown need not repeat. The player may obtain a winning outcome by, for example, having the reels stop so that the currently displayed line thickness displayed along a payline of the slot machine on each reel is the same. Commonly-owned, co-pending U.S. patent application Ser. No. 10/391,034, filed Mar. 17, 2003 and entitled ELECTRONIC AMUSEMENT DEVICE AND METHOD FOR OPERATING A GAME OFFERING CONTINUOUS REELS describes embodiments where a continuous line may be displayed along a length of a reel surface. This application is incorporated by reference herein for all purposes.

In various embodiments of the present invention, multiple reels may rotate in tandem without limiting the number of indicia combinations, or outcomes, that can be displayed to the player. This is because reels of the present invention may change the indicia currently being displayed. For example, suppose three display devices are in the same relative angular positions, but on three separate reels. When first viewed by the player, the first display device (or a particular angular surface location of the first display device) shows "bar," the second "plum," and the third "orange." Together, they make "bar-plum-orange." However, when the reels rotate so that the three display devices are no longer in view of the player, the first display device may switch to "bell," the second to "cherry," and the third to "bell." Now the three display devices show "bell-cherry-bell." The next time the three display devices come in view of the player, the player sees an outcome he hadn't seen the last time around, even though he is seeing the same three display devices or the same three angular surface locations of the same three devices.

In some embodiments of the present invention, the display devices may display messages to a player indicating the state or the mode of a slot machine. For example, the slot machine may be in a locked or reserved state, in which case a player might not be allowed to use the slot machine unless he knows the proper password, or unless he inserts the proper player-tracking card. A reserved slot machine might display, for example, "reserved." The state or mode of a slot machine might describe the way in which a slot machine will pay out. For example, a slot machine in a "don't" mode may pay out only for outcomes that are typically regarded as losing outcomes, and may not pay out for outcomes that are typically regarded as winning outcomes. A slot machine in "insurance" mode may guarantee a player a payment equal to 50% of his losses at the slot machine. A slot machine in insurance mode might display, for example, "Insurance in Effect." Other modes may include modes where a slot machine makes periodic, guaranteed payouts to a player, modes where a portion of a player's winnings are withheld to pay for future benefits, and modes where a player's winnings are shared among team members. Many other modes are possible, and many other text messages or signs may be displayed indicating such modes.

In one or more embodiments, display devices or angular surface locations of display devices that are not displayed along a payline may display indicia unrelated to the game at hand. For example, a first display device on a reel stops along a payline. The first display device shows the image of a plum symbol. A second display device on the same reel is located right above the first display device. The second display device, however, is not displayed along a payline. Therefore, the second display device may display anything, since its display has no effect on what the player will be paid. For example, display devices or angular surface locations of display devices not displayed along a payline may display advertisements to the player. Advertisers may pay the casino for advertising their products on the slot machines. Display devices or angular surface locations of display devices not displayed along a payline may also display video clips from television shows, movies, or sporting events, and text messages for the player, including explanations of an outcome, messages relating to the mode of the slot machine, communications from other players, and survey questions for the player to answer in return for a benefit. Advertisements and other displays unrelated to the game may even be displayed on display devices or angular surface locations of display devices that are displayed along a payline, so long as the advertisements do not obscure the other indicia displayed thereon. In addition, advertisements and other displays unrelated to the game may be displayed on display devices or angular surface locations of display devices that cross a payline, so long as the display devices or angular surface locations of display devices do not stop along the payline.

Embodiments of the present invention provide a convenient platform on which a player might view multiple video feeds simultaneously. For example, a player may watch multiple television channels simultaneously. The player may watch each television channel, for example, on a separate display device or angular surface location of a display device. The player could thereby watch a different channel for every display device in view of the player. This embodiment might allow an avid sports fan, for example, to follow multiple basketball games simultaneously.

In one embodiment, one or more mirrors may multiply the number of apparent spinning reels. For example, a physical reel may rotate in a plane parallel to a mirror. A player watching the reel would also see the reflection of the reel in the mirror, making it appear as if there were two spinning reels. If the physical reel were flanked on either side by a mirror, then, together, the two mirrors could create an indefinite number of apparent replicas of the reel.

In one embodiment, a player may wear goggles that display images to the player. The goggles may, for example, contain small display screens maintained in front of the player's eyes. The screens may show animated images of a set of reels. Furthermore, the images shown to the player's left and right eyes may differ in the apparent viewing angle with which the reels are shown. This offset in viewing angle may create an illusion of three-dimensionality for the image. The player's goggles may be in communication with a slot machine, e.g. via a tether wire or wireless communication. The player's slot machine may generate an outcome and communicate the outcome to the goggles. The goggles may then display the spinning of reels, ultimately resulting in the reels stopping to reveal the outcome communicated from the slot machine. Using the goggles, the player may perceive a better illusion of three dimensionality than he would viewing a flat display screen on a slot machine. Of course, the goggles may use other well-known techniques for creating illusions of three-dimensionality. For example, the goggles may display random-dot stereograms.

In one embodiment, a player may wear glasses or goggles that interact with the images displayed on a slot machine to create the illusion of three-dimensionality. For example, a display device of a slot machine alternately displays a rendition the same object first as if viewed from a player's right eye, and secondly as if viewed from a player's left eye. Meanwhile, the player wears goggles that alternately block out the view from a player's left and right eyes. For example, the goggles alternately darken a lens in front of a player's left and right eyes. The goggles are synchronized with the slot machine. When the slot machine displays an image as if viewed from a player's right eye, the left lens of the goggles is darkened, so that the player can only see the image using his right eye. When the slot machine displays an image as if viewed from the player's left eye, the right lens of the goggles is darkened, so that the player can only see the image using his left eye. The left and right images, and the darkening of the lenses, are alternated many times per second, so that it appears to the player as if he has continuous viewing ability through both lenses. The overall effect is to make the image of the slot machine appear three-dimensional. The player may thereby view reels displayed on a flat display device as if they were three-dimensional reels.

In another embodiment, two projectors project images onto the same location of a screen on a slot machine that is in view of a player. The two projectors each project images of the same object, although, again, one image shows the object as if viewed using the left eye, and one image shows the object as if viewed from the right eye. Each projector projects through a polarizing filter. The polarizing filter of one of the projectors only allows the passing of light whose polarization is of a first orientation, and the polarizing filter of the other projector only allows the passing of light whose polarization is of a second orientation. The two orientations are perpendicular to one another. Meanwhile, the player wears glasses containing polarizing lenses. One lens corresponds to the polarization of the first polarizing filter. The other lens corresponds to the polarization of the second polarizing filter. Thus, with a given eye, the player can only see an image projected from one of the two projectors. With his right eye, the player sees the image of the object as if viewed from the right eye. With his left eye, the player sees the image of the object as if viewed from his left eye. Once again, the disparate views of the object create the illusion of three-dimensionality. This technique for creating an illusion of three-dimensionality is the same technique used in some 3D movies.

Even though only certain embodiments have been described in detail, those having ordinary skill in the art will certainly appreciate and understand that many modifications, changes, and enhancements are possible without departing from the teachings thereof. All such modifications are intended to be encompassed within the following claims.

What is claimed is:

1. A method, comprising:

causing at least one display device of a slot machine to rotate about an axis, wherein the at least one display device includes a plurality of surface locations, each surface location comprising a substantially rigid electronic display screen, each electronic display screen operable to display an image of a respective indicium of a plurality of available indicia;

determining a particular indicium of the plurality of indicia to be displayed as an image of the indicium on the rigid electronic display screen along a payline of the slot machine when the at least one display device has stopped rotating;

determining a velocity at which the at least one display device rotates;

determining the surface location that will be displayed along the payline of the slot machine when the display device stops its rotation using the determined velocity;

changing the image on the determined surface location to the image of the determined indicium when the determined surface location is not in view of a player using the slot machine; and causing the image of the determined indicium to be displayed on the rigid electronic display screen at the determined surface location.

2. The method of claim 1, wherein the particular surface location is intermittently viewable from a viewing perspective, and wherein causing comprises:

causing the determined indicium to first be displayed at the particular surface location when the particular surface location is not viewable from the viewing perspective.

3. A slot machine, comprising:

at least one electronic display device comprising a plurality of surface locations, each surface location comprising a substantially rigid electronic display screen, each electronic display screen operable to display an image of at least one indicium defining an outcome for a game, the indicium being one of a plurality of indicia available to be selectably displayed on that rigid electronic display screen based on a predetermined velocity that enables a particular surface location to be displayed along a payline when the at least one electronic display stops rotating, the image displayed on the particular surface location being changed to the image of the selected indicium when the particular surface location is not in view of a player using the slot machine, wherein a left edge of said display device defines at least a portion of a left base of a cylindrical shape and a right edge of said display device defines at least a portion of a right base of the cylindrical shape.

4. The slot machine of claim 3, wherein the left edge defines at least a portion of a surface simulating a reel shape and the right edge defines at least a portion of the surface simulating the reel shape.

5. The slot machine of claim 3, further comprising:

a first rim located along the left edge, and a second rim located along the right edge.

6. The slot machine of claim 5, further comprising:

means for moving the first rim and the second rim.

7. The slot machine of claim 6, wherein the means for moving comprises:

means for moving the first rim and the second rim in a curvilinear motion.

8. The slot machine of claim 7, wherein the slot machine further comprises:

a shaft; and wherein the means for moving comprises:

means for moving the first rim and the second rim about the shaft.

9. The slot machine of claim 6, wherein the means for moving comprises:

means for moving the first rim and the second rim relative to the at least one display device, the at least one display device remaining stationary during the movement of the first rim and the second rim.

10. The slot machine of claim 9, wherein the means for moving comprises:

means for moving the first rim and the second rim in a synchronous manner such that the first rim and the second rim simultaneously begin moving, simultaneously stop moving, and each respectively move at an equal velocity.

11. The slot machine of claim 5, wherein at least one of the first rim and the second rim is made of a mirrored surface.

12. The slot machine of claim 11, further comprising:

a circular surface, the circular surface being reflected in the mirrored surface of at least one of the first rim and the second rim and further being located in a location not visible to a player of the slot machine; and means for moving the circular surface relative to the mirrored surface, the mirrored surface reflecting the moving circular surface such that the mirrored surface appears to be moving.

13. A slot machine comprising:

at least one display device comprising a plurality of surface locations, each surface location comprising a substantially rigid electronic display screen, each electronic display screen operable to electronically display at least one indicium at a time from a plurality of indicia that may be displayed on that electronic display screen at different times, the at least one indicium defining an outcome for a game; and at least one controller, wherein said at least one controller is configured to:

cause said at least one display device to rotate about an axis;

determine a particular indicium to be displayed along a payline of said slot machine when said display device has stopped rotating;

determine a rotational velocity for said display device, wherein the determined velocity enables a particular surface location to be displayed along a payline when said display device stops rotating; and cause the image displayed on the particular surface location to be changed to the image of the determined particular indicium when the particular surface location is not in view of a player using the slot machine the determined indicium to be displayed on the particular electronic display screen by selecting one indicium from a plurality of indicia that are available to be displayed on the particular electronic display screen.

14. The slot machine of claim 13, wherein each surface location of said plurality of surface locations is intermittently viewable from a viewing perspective, and wherein said at least one controller is further configured to cause the particular indicium to first be displayed at said particular surface location when said particular surface location is not viewable from the viewing perspective.

15. The slot machine of claim 13, further comprising a left edge that defines at least a portion of a left base of a cylindrical shape and a right edge that defines at least a portion of a right base of the cylindrical shape, wherein said at least one display device further comprises a first rim located along said left edge and a second rim located along said right edge.

16. The slot machine of claim 15, wherein said at least one controller is further configured to move said first rim and said second rim.

17. The slot machine of claim 16, wherein said at least one controller is further configured to move said first rim and said second rim in a curvilinear motion.

18. The slot machine of claim 17 further comprising a shaft, wherein said at least one controller is further configured to move said first rim and said second rim about said shaft.

19. The slot machine of claim 16, wherein said at least one controller is further configured to move said first rim and said second rim relative to said at least one display device, wherein said at least one display device remains stationary during the movement of said first rim and said second rim.

20. The slot machine of claim 19, wherein said at least one controller is further configured to move said first rim and said second rim in a synchronous manner such that said first rim and said second rim begin moving at approximately the same time, stop moving at approximately the same time, and each respectively moves at approximately the same velocity.

* * * * *